(12) United States Patent
Saito et al.

(10) Patent No.: US 12,422,928 B2
(45) Date of Patent: Sep. 23, 2025

(54) INFORMATION PROCESSING APPARATUS, INFORMATION PROCESSING METHOD, AND PROGRAM

(71) Applicant: Sony Group Corporation, Tokyo (JP)

(72) Inventors: Mari Saito, Kanagawa (JP); Koji Nagata, Tokyo (JP); Kazuko Yamagishi, Chiba (JP); Hiroshi Oyamada, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/576,014

(22) PCT Filed: Mar. 10, 2022

(86) PCT No.: PCT/JP2022/010534
§ 371 (c)(1),
(2) Date: Jan. 2, 2024

(87) PCT Pub. No.: WO2023/286343
PCT Pub. Date: Jan. 19, 2023

(65) Prior Publication Data
US 2024/0256042 A1    Aug. 1, 2024

(30) Foreign Application Priority Data
Jul. 12, 2021   (JP) .................................. 2021-115204

(51) Int. Cl.
*G06F 3/01*   (2006.01)
(52) U.S. Cl.
CPC .............. *G06F 3/015* (2013.01); *G06F 3/016* (2013.01)

(58) Field of Classification Search
CPC .. G06F 3/011–013; G06F 3/015; G06F 3/016; G02B 27/0093; G02B 27/017; G02B 27/0172; G02B 27/0176; G02B 27/0179; G02B 2027/0174; G02B 2027/0178; G02B 2027/0181–0187
See application file for complete search history.

(56) References Cited

U.S. PATENT DOCUMENTS

2017/0111636 A1* 4/2017 Hasegawa ................. G06T 7/60
2018/0096244 A1* 4/2018 Mallinson ............... G06F 3/012
(Continued)

FOREIGN PATENT DOCUMENTS

| JP | 2004-246725 A | 9/2004 |
|---|---|---|
| JP | 2017-054457 A | 3/2017 |
| JP | 2017-182130 A | 10/2017 |

(Continued)

*Primary Examiner* — Nathan Danielsen
(74) *Attorney, Agent, or Firm* — Paratus Law Group, PLLC

(57) ABSTRACT

An information processing apparatus according to an embodiment of the present technology includes an acquisition section and a stimulus controller. The acquisition section acquires visually-induced-motion-sickness information that includes at least one of information obtained by estimating a state of a visually induced motion sickness of a user who is viewing video content, or information obtained by predicting the state of the visually induced motion sickness. The stimulus controller controls provision of a stimulus to the user, on the basis of the visually-induced-motion-sickness information.

19 Claims, 10 Drawing Sheets

(56) References Cited

U.S. PATENT DOCUMENTS

2021/0016052 A1\* 1/2021 Delaney ................. G16H 20/70
2021/0154430 A1\* 5/2021 Lev ........................ G06F 3/011

FOREIGN PATENT DOCUMENTS

| JP | 2018-126185 A | 8/2018 |
|----|---------------|--------|
| JP | 2021-092883 A | 6/2021 |
| WO | WO 2020/090477 A1 | 5/2020 |

\* cited by examiner

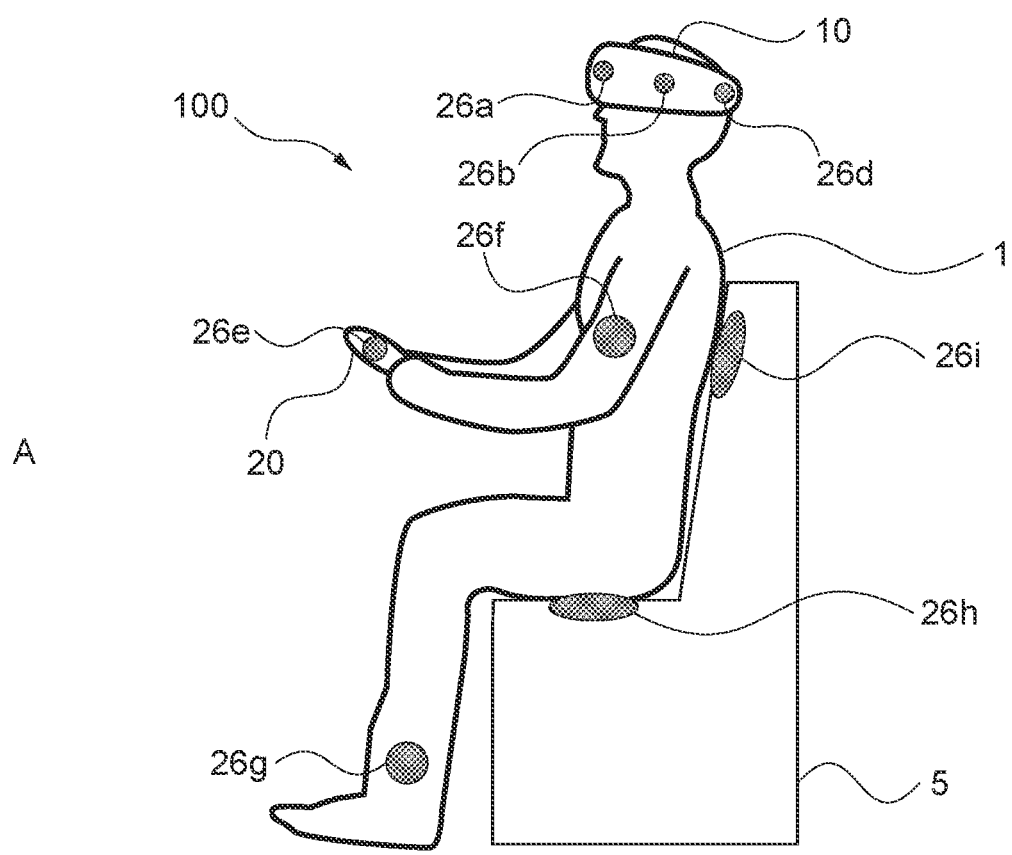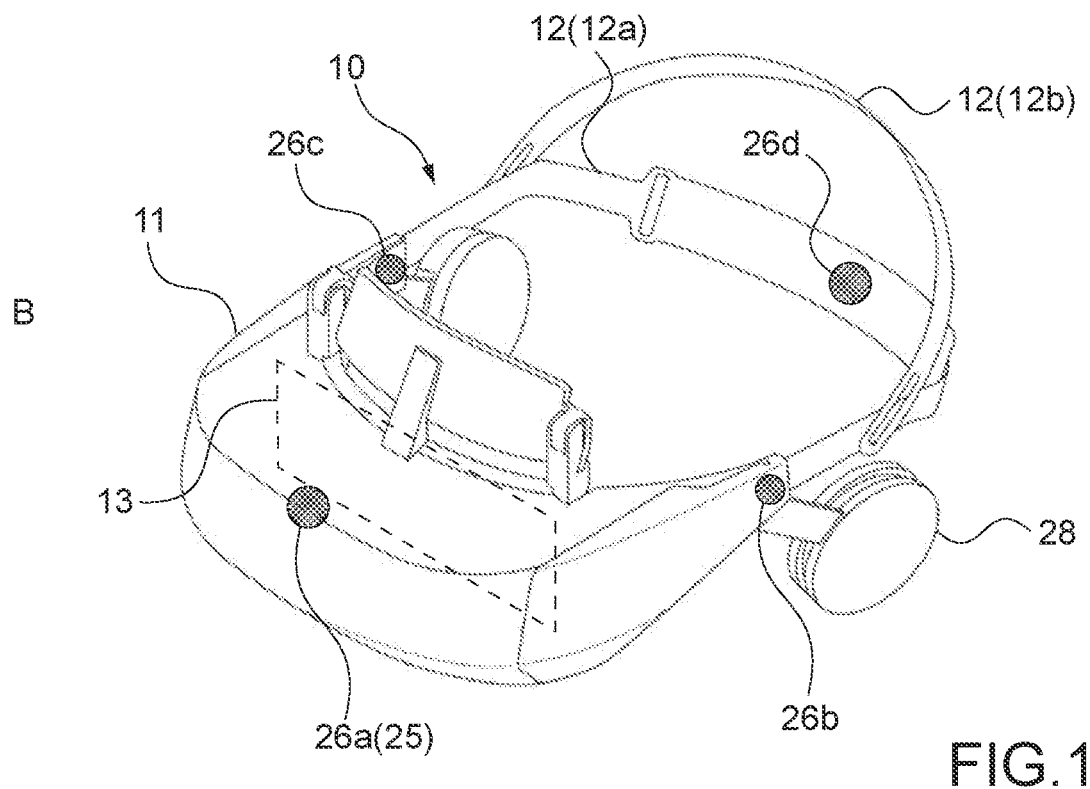
FIG.1

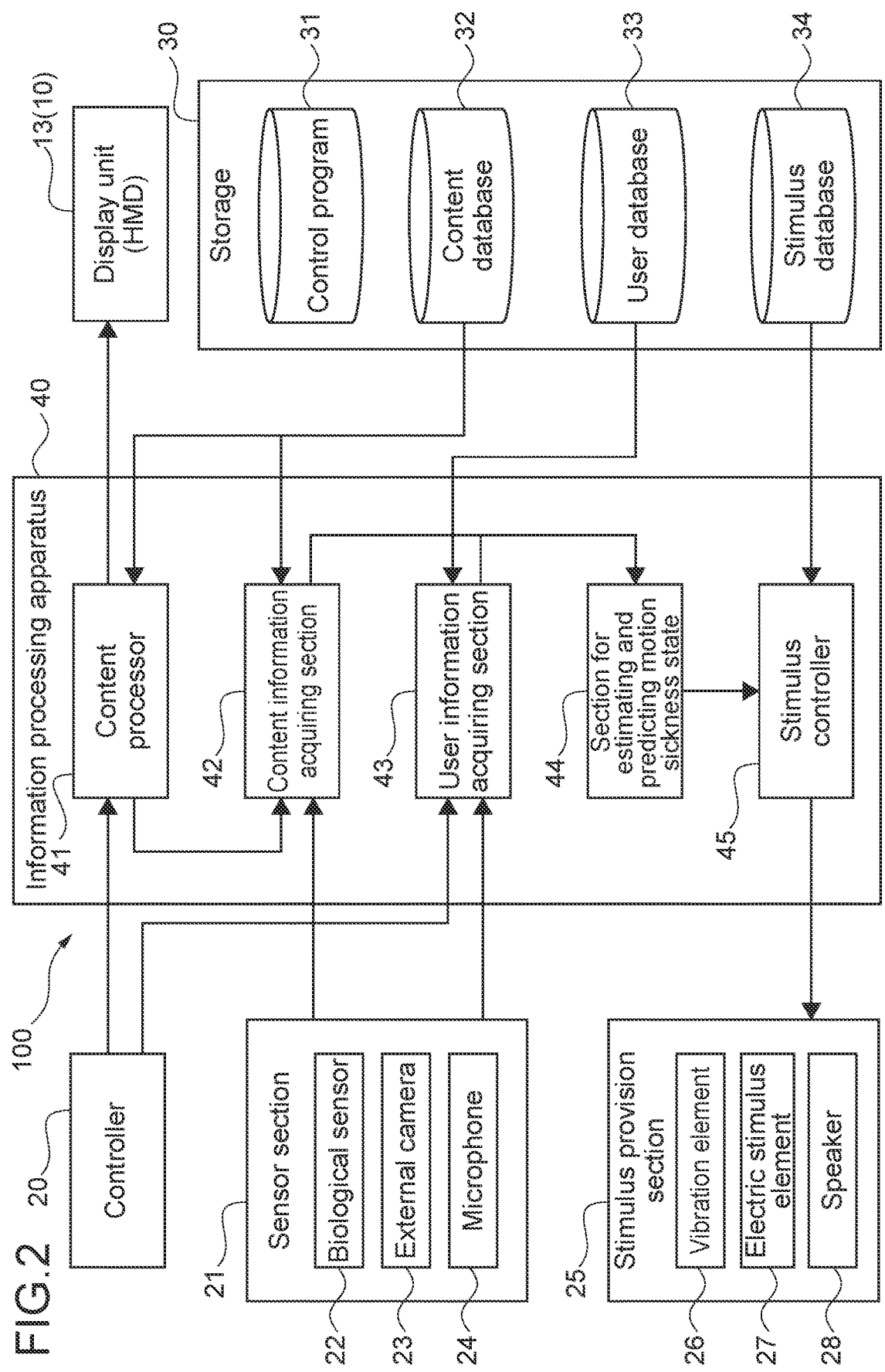

| | Controller operation | Sweating | Heart rate variability |
|---|---|---|---|
| Level 1 Not getting motion sickness at all | Steady-state operation predicted from history | Change of less than 3%, compared to sweat volume in steady state | Change of less than 3%, compared with heart rate variability in steady state |
| Level 2 There is sign of motion sickness | Varying from steady-state operation by greater than or equal to 3% and less than 5% | Change of greater than or equal to 3% and less than 5%, compared to sweat volume in steady state | Change of greater than or equal to 3% and less than 5%, compared with heart rate variability in steady state |
| Level 3 Starting getting motion sickness | Varying from steady-state operation by greater than or equal to 5% and less than 10% | Change of greater than or equal to 5% and less than 10%, compared to sweat volume in steady state | Change of greater than or equal to 5% and less than 10%, compared with heart rate variability in steady state |
| Level 4 Having motion sickness | Varying from steady-state operation by greater than or equal to 10% | Change of greater than or equal to 10%, compared to sweat volume in steady state | Change of greater than or equal to 10%, compared with heart rate variability in steady state |

| Content state information | | | | |
|---|---|---|---|---|
| Time | Value of motion sickness factor | | | Scene ID |
| | Factor 1 | Factor 2 | ... | |
| t1 | 0 | 10 | | A |
| t2 | 0 | 10 | | A |
| t3 | 0 | 10 | | A |
| t4 | 0 | 10 | | A |
| t5 | 0 | 10 | | A |
| t6 | 0.8 | 45 | | B |
| t7 | 0.9 | 48 | | B |
| t8 | 0.8 | 45 | | B |
| t9 | 0.8 | 46 | | B |
| t10 | 0.9 | 45 | | B |
| t11 | 0 | 10 | | C |
| t12 | 0 | 10 | | C |
| t13 | 0 | 10 | | C |
| t14 | 0 | 10 | | C |
| t15 | 0 | 10 | | C |

⋮

B

| Characteristics regarding ease of causing motion sickness | | | | |
|---|---|---|---|---|
| Time | Ease of causing motion sickness | | | |
| | Comprehensive value | Factor 1 | Factor 2 | ... |
| t1 | 1 | 0 | 1 | |
| t2 | 1 | 0 | 1 | |
| t3 | 1 | 0 | 1 | |
| t4 | 1 | 0 | 1 | |
| t5 | 1 | 0 | 1 | |
| t6 | 4 | 4 | 2 | |
| t7 | 4 | 4 | 2 | |
| t8 | 4 | 4 | 2 | |
| t9 | 4 | 4 | 2 | |
| t10 | 4 | 4 | 2 | |
| t11 | 1 | 0 | 1 | |
| t12 | 1 | 0 | 1 | |
| t13 | 1 | 0 | 1 | |
| t14 | 1 | 0 | 1 | |
| t15 | 1 | 0 | 1 | |

⋮

| Scene ID | Content characteristic information | | | |
|---|---|---|---|---|
| | Comprehensive value | Factor 1 | Factor 2 | ... |
| A | 1 | 0 | 1 | |
| B | 4 | 4 | 2 | |
| C | 1 | 0 | 1 | |
| D | 2 | 1 | 2 | |
| E | 4 | 1 | 4 | |
| F | 3 | 3 | 2 | |
| G | 4 | 1 | 4 | |

| Motion sickness state | | | | | Ease of causing motion sickness | | | |
|---|---|---|---|---|---|---|---|---|
| Time | Degree | Symptom 1 Headache | Symptom 2 Dizziness | ... | Comprehensive value | Factor 1 | Factor 2 | ... |
| 1min | 1 | – | – | | 1 | 0 | 1 | |
| 2min | 1 | – | – | | 2 | 0 | 1 | |
| 3min | 1 | – | – | | 1 | 0 | 1 | |
| 4min | 2 | – | – | | 1 | 1 | 2 | |
| 5min | 3 | – | ◯ | | 1 | 1 | 2 | |
| 6min | 3 | – | ◯ | | 2 | 1 | 2 | |
| 7min | 3 | – | ◯ | | 1 | 1 | 1 | |
| 8min | 3 | – | ◯ | | 5 | 1 | 5 | |
| 9min | 3 | – | ◯ | | 5 | 0 | 5 | |
| 10min | 3 | – | ◯ | | 5 | 0 | 5 | |
| 11min | 3 | – | ◯ | | 5 | 0 | 5 | |
| 12min | 3 | – | ◯ | | 5 | 0 | 5 | |
| 13min | 3 | ◯ | ◯ | | 3 | 0 | 2 | |
| 14min | 4 | ◯ | ◯ | | 4 | 0 | 3 | |
| 15min | 4 | ◯ | ◯ | | 4 | 0 | 3 | |

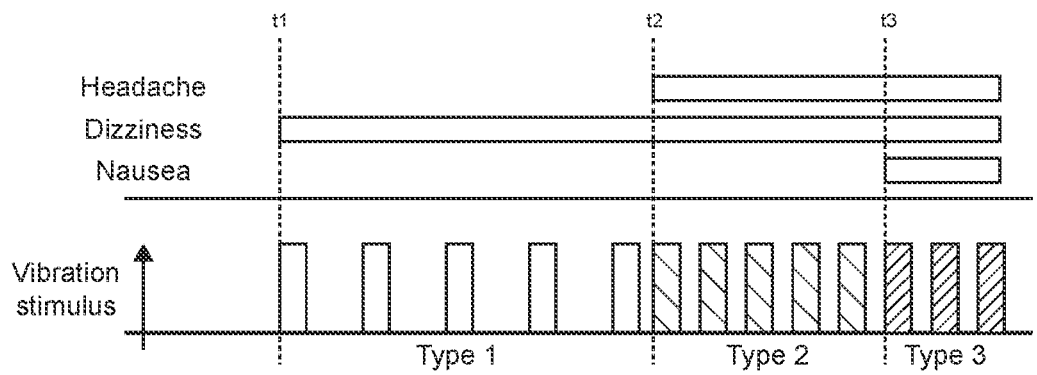
FIG.10
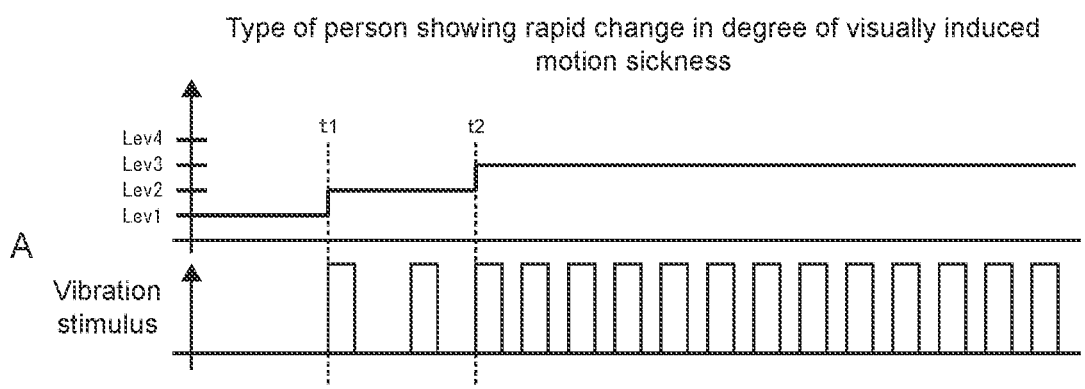
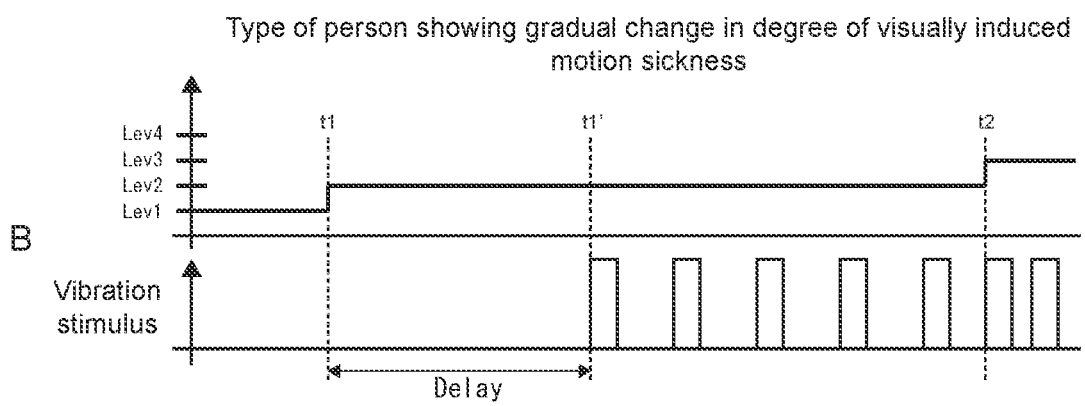
FIG.11

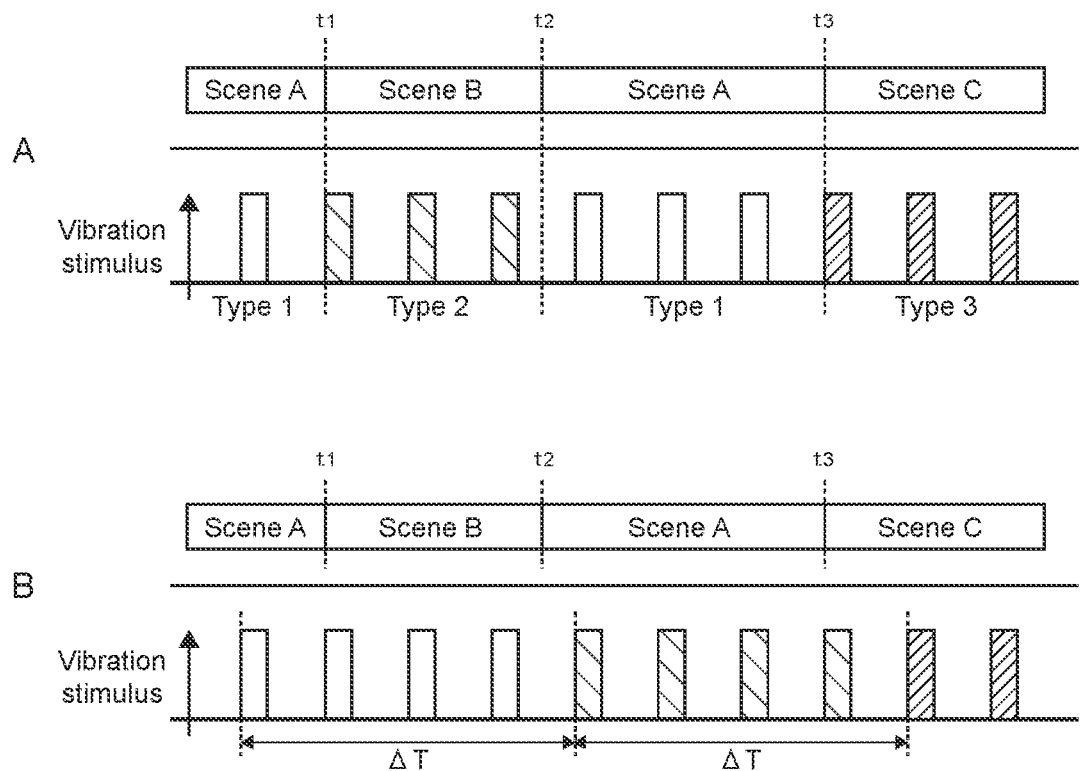
FIG.12
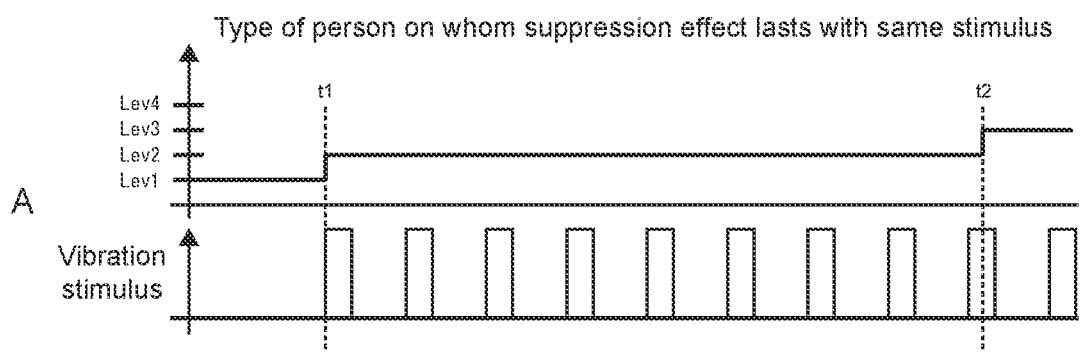
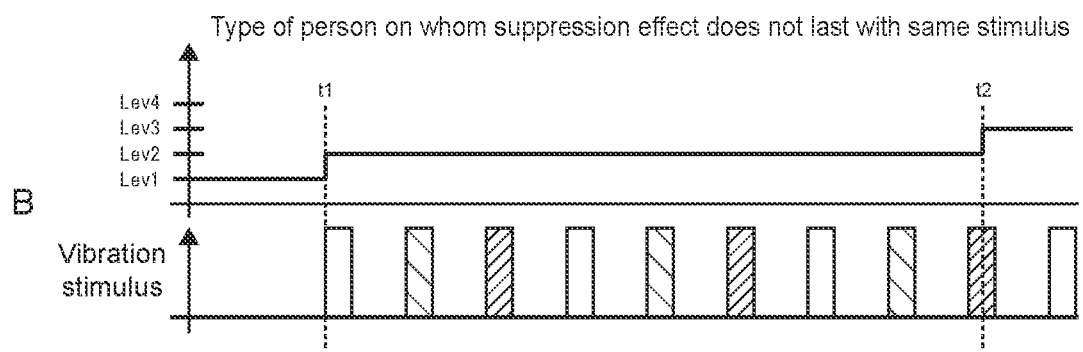
FIG.13

INFORMATION PROCESSING APPARATUS, INFORMATION PROCESSING METHOD, AND PROGRAM

CROSS REFERENCE TO PRIOR APPLICATION

This application is a National Stage Patent Application of PCT International Patent Application No. PCT/JP2022/010534 (filed on Mar. 10, 2022) under 35 U.S.C. § 371, which claims priority to Japanese Patent Application No. 2021-115204 (filed on Jul. 12, 2021), which are all hereby incorporated by reference in their entirety.

TECHNICAL FIELD

The present technology relates to an information processing apparatus, an information processing method, and a program that can be applied to an apparatus that reproduces video content.

BACKGROUND ART

In recent years, technologies that play back videos using, for example, head-mounted displays (HMDs) or large-screen displays have been developed. A user who uses such a system can view videos with a great sense of immersion, but may get, for example, a visually induced motion sickness.

Patent Literature 1 discloses an entertainment system configured to decrease a degree of visually induced motion sickness. The system includes an HMD including a shaking section. Further, the shaking section is driven according to an acceleration state of a viewpoint in a moving image displayed by the HMD. This makes it possible to shake a head of a user who is wearing the HMD together with a moving image that is being viewed by the user, and thus to decrease a degree of visually induced motion sickness (for example, paragraphs [0031], [0039], [0056], and [0057] of the specification, and FIG. 1 in Patent Literature 1).

CITATION LIST

Patent Literature

Patent Literature 1: WO 2020/090477

DISCLOSURE OF INVENTION

Technical Problem

A technology that provides a viewing experience with a great sense of immersion is expected to be applied in various fields including the fields of entertainment, education, and an operation support in the future, and thus there is a need for a technology that makes it possible to sufficiently suppress a visually induced motion sickness of a user.

In view of the circumstances described above, it is an object of the present technology to provide an information processing apparatus, an information processing method, and a program that make it possible to sufficiently suppress a visually induced motion sickness of a user.

Solution to Problem

In order to achieve the object described above, an information processing apparatus according to an embodiment of the present technology includes an acquisition section and a stimulus controller.

The acquisition section acquires visually-induced-motion-sickness information that includes at least one of information obtained by estimating a state of a visually induced motion sickness of a user who is viewing video content, or information obtained by predicting the state of the visually induced motion sickness.

The stimulus controller controls provision of a stimulus to the user, on the basis of the visually-induced-motion-sickness information.

In the information processing apparatus, a stimulus is provided to a user who is viewing video content. Here, the provision of the stimulus to the user is controlled on the basis of information obtained by estimating or predicting a state of a visually induced motion sickness of the user. This makes it possible to, for example, provide a stimulus suitable for a state of the user, and thus to sufficiently suppress the visually induced motion sickness of the user.

The acquisition section may acquire, as the visually-induced-motion-sickness information, degree information that includes at least one of information obtained by estimating a degree of the visually induced motion sickness of the user, or information obtained by predicting the degree of the visually induced motion sickness. In this case, the stimulus controller may control the provision of the stimulus to the user according to the degree information.

The stimulus controller may start the provision of the stimulus to the user when the degree of the visually induced motion sickness reaches a specified level, the degree of the visually induced motion sickness being indicated by the degree information.

The specified level may be set to be a level at which a sign of the visually induced motion sickness of the user is shown.

On the basis of at least one of user state information that indicates a visually-induced-motion-sickness-related state of the user, user characteristic information that indicates visually-induced-motion-sickness-related characteristics of the user, content state information that indicates a visually-induced-motion-sickness-related state of the video content, or content characteristic information that indicates visually-induced-motion-sickness-related characteristics of the video content, the acquisition section may perform at least one of estimation processing or prediction processing to generate the visually-induced-motion-sickness information, the estimation processing being processing of estimating the state of the visually induced motion sickness of the user, the prediction processing being processing of predicting the state of the visually induced motion sickness of the user.

The user state information may include at least one of biological information regarding the user, operation information regarding an operation performed by the user, speech information regarding speech of the user, or report information regarding a report of the user.

The biological information may include information regarding at least one of a sweat volume of the user, a heart rate of the user, an amount of a movement of eyeballs of the user, body shaking of the user, or an electrocardiogram waveform of the user.

The content state information may include information regarding a motion sickness factor for a visually induced motion sickness in the video content, which is being played back. In this case, on the basis of the information regarding the motion sickness factor that is included in the content state information, the acquisition section may estimate characteristics regarding ease of causing a motion sickness due to the video content, which is being played back.

For each scene included in the video content, or for the entirety of content, the content characteristic information may include information regarding pre-estimated characteristics regarding ease of causing a motion sickness due to the video content. In this case, the acquisition section may read the characteristics regarding ease of causing a motion sickness that are included in the content characteristic information.

The user characteristic information may include history information obtained by recording a state of a visually induced motion sickness caused upon a previous viewing experience of the user, and characteristics regarding ease of causing a motion sickness upon the viewing experience, the state and characteristics being recorded in association with each other. In this case, the acquisition section may generate the visually-induced-motion-sickness information on the basis of characteristics regarding ease of causing a motion sickness due to the video content, which is being played back, and on the basis of the history information.

On the basis of the visually-induced-motion-sickness information, the stimulus controller may control at least one of a timing of providing the stimulus, a continuation period of time for which the stimulus is provided continuously, a parameter for the stimulus, or a type of the stimulus.

The acquisition section may acquire, as the visually-induced-motion-sickness information, information regarding a symptom of the visually induced motion sickness of the user. In this case, the stimulus controller may set the type of the stimulus provided to the user, according to the symptom of the visually induced motion sickness.

The acquisition section may acquire, as the visually-induced-motion-sickness information, information regarding a type of a change in a degree of the visually induced motion sickness of the user. In this case, the stimulus controller may set the timing of providing the stimulus, according to the type of the change in the degree of the visually induced motion sickness.

The acquisition section may acquire information regarding a stimulus that provides a great effect of suppressing the visually induced motion sickness of the user. In this case, the stimulus controller may provide, to the user, the stimulus providing the great suppression effect.

For each scene included in the video content or for each specified interval of time, the stimulus controller may change the stimulus provided to the user.

The acquisition section may determine whether an effect of suppressing a visually induced motion sickness lasts on the user, the effect being provided by the same stimulus. In this case, when the acquisition section has determined that the suppression effect lasts, the stimulus controller may continuously provide the same stimulus to the user, and when the acquisition section has determined that the suppression effect does not last, the stimulus controller may change a type of the stimulus provided to the user.

The stimulus provided to the user may include at least one of a vibration stimulus, an electric stimulus, a sound stimulus, or a light stimulus.

On the basis of the visually-induced-motion-sickness information, the stimulus controller may change the video content such that an increase in a degree of the visually induced motion sickness of the user is suppressed.

An information processing method according to an embodiment of the present technology is an information processing method that is performed by a computer system, the information processing method including acquiring visually-induced-motion-sickness information that includes at least one of information obtained by estimating a state of a visually induced motion sickness of a user who is viewing video content, or information obtained by predicting the state of the visually induced motion sickness.

Provision of a stimulus to the user is controlled on the basis of the visually-induced-motion-sickness information.

A program according to an embodiment of the present technology causes a computer system to perform a process including:
acquiring visually-induced-motion-sickness information that includes at least one of information obtained by estimating a state of a visually induced motion sickness of a user who is viewing video content, or information obtained by predicting the state of the visually induced motion sickness; and
controlling provision of a stimulus to the user, on the basis of the visually-induced-motion-sickness information.

BRIEF DESCRIPTION OF DRAWINGS

FIG. 1 schematically illustrates an example of a configuration of a content provision system according to an embodiment of the present technology.

FIG. 2 is a block diagram illustrating an example of a functional configuration of the content provision system.

FIG. 3 illustrates an example of a determination table for a degree of a visually induced motion sickness of a user.

FIG. 4 is a set of tables in which an example of content state information regarding video content is given.

FIG. 5 is a table in which an example of content characteristic information regarding video content is given.

FIG. 6 is a table in which an example of history information regarding a visually induced motion sickness of a user is given.

FIG. 10 is a time chart illustrating an example of provision of a stimulus.

FIG. 11 is a set of time charts each illustrating an example of provision of a stimulus.

FIG. 12 is a set of time charts each illustrating an example of provision of a stimulus.

FIG. 13 is a set of time charts each illustrating an example of provision of a stimulus.

MODE(S) FOR CARRYING OUT THE INVENTION

Figure 7:
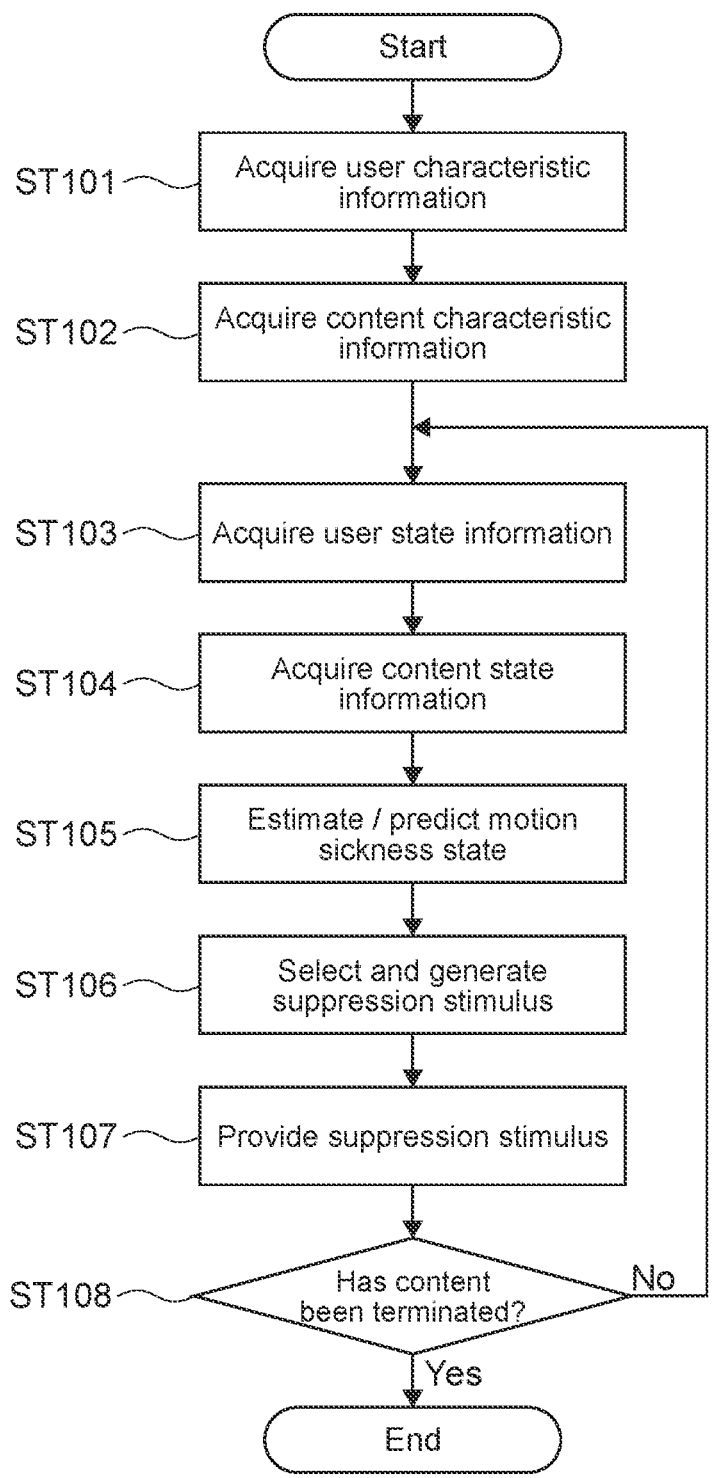
FIG. 7 is a flowchart illustrating an example of an operation of the content provision system.

Embodiments according to the present technology will now be described below with reference to the drawings.
[Configuration of Content Provision System]

FIG. 1 schematically illustrates an example of a configuration of a content provision system 100 according to an embodiment of the present technology. The content provision system 100 is a system that provides various video content using an HMD 10. The HMD 10 is a display apparatus that is used by being worn on a head of a user 1 and displays an image in a field of view of the user 1.

The video content is content that provides a video (a moving image) to a user. Examples of the video content include a video (VR content) in which a virtual reality (VR)

space is displayed, a simulator video, a video of, for example, a movie or a drama, and a video of a real space. Further, in the video content, sound is reproduced together with playback of a video. Moreover, content that provides, for example, a tactile sense may be used as the video content.

A of FIG. 1 schematically illustrates the user 1 experiencing video content using the content provision system 100. Here, the user 1 who is wearing the HMD 10 is experiencing video content in a state of being seated in a chair 5. Further, the user 1 can perform various input operations related to video content by operating a controller 20.

When the user 1 experiences VR using, for example, the HMD 10, this will cause the user 1 to get a visually induced motion sickness (a VR sickness). This is a phenomenon in which the user 1 gets a motion sickness due to a video itself while viewing video content. On the other hand, a mechanism of a visually induced motion sickness is still largely unknown, and there are not sufficient approaches of suppressing the visually induced motion sickness effectively.

Thus, in the present embodiment, a stimulus provision section 25 described later provides a physical stimulus that the user 1 who is viewing video content can feel. The above-described provision of an appropriate stimulus to the user 1 makes it possible to suppress a visually induced motion sickness of the user 1.

In the content provision system 100, such a provision of a stimulus that suppresses a visually induced motion sickness is controlled according to a state of a visually induced motion sickness of the user 1. This makes it possible to sufficiently suppress a visually induced motion sickness of the user 1.

B of FIG. 1 schematically illustrates an example of a configuration of the HMD 10. As illustrated in B of FIG. 1, the HMD 10 includes a base 11, an attachment band 12, and a display unit 13. Further, a sensor section 21 described later and the stimulus provision section 25 are provided to the HMD 10 as appropriate.

The base 11 is a member arranged in front of left and right eyes of the user 1. The base 11 is configured to cover the field of view of the user 1, and serves as a housing that accommodates therein, for example, the display unit 13.

The attachment band 12 is attached to the head of the user 1. The attachment band 12 includes a side-of-head band 12a and a top-of-head band 12b. The side-of-head band 12a is connected to the base 11, and is attached to surround the head of the user from the side to the back of the head. The top-of-head band 12b is connected to the side-of-head band 12a, and is attached to surround the head of the user from the side to the top of the head. This makes it possible to hold the base 11 in front of the eyes of the user 1.

The display unit 13 is arranged in front of the eyes of the user 1, and displays a moving image of video content. The display unit 13 is formed using a display element such as a liquid crystal display (LCD) or an organic EL display.

The display unit 13 includes a left-eye display and a right-eye display. The left-eye display and the right-eye display respectively display, to the left eye and the right eye of the user 1, images corresponding to the respective eyes. This makes it possible to, for example, display a VR space stereoscopically. Note that the display unit 13 may be configured to display a single image to the two eyes of the user 1.

FIG. 2 is a block diagram illustrating an example of a functional configuration of the content provision system 100. In addition to the HMD 10 (the display unit 13) described above, the content provision system 100 further includes the controller 20, the sensor section 21, the stimulus provision section 25, a storage 30, and an information processing apparatus 40.

The controller 20 is an operation input apparatus used by the user 1 to perform input operations, and the controller 20 is connected to the information processing apparatus 40 through, for example, a communication section (not illustrated). The controller 20 is an apparatus configured to be held by the user 1 with his/her two hands, and the controller 20 includes operation sections such as a direction key, a selection button, and an operation stick. The user 1 can perform various input operations by operating the operation sections as appropriate. A specific configuration of the controller 20 is not limited, and an input device such as an apparatus used by being held with a single hand, a mouse, a keyboard, or a touch panel may be used as the controller 20.

The sensor section 21 is a sensor element used to detect a state of the user 1 who is viewing video content. The sensor element is provided to, for example, a device (such as the HMD 10 or the controller 20) that is being used by the user 1, or a device that is arranged around the user 1.

In the present embodiment, the sensor section 21 includes a biological sensor 22, an external camera 23, and a microphone 24.

The biological sensor 22 is a sensor that detects biological information regarding the user 1, and is provided to, for example, the HMD 10 or the controller 20. Further, for example, the biological sensor 22 provided to another device such as a wearable device that is worn by the user 1 may be used.

For example, an acceleration sensor is used as the biological sensor 22. The acceleration sensor detects body shaking such as shaking of the body or the head of the user 1.

Further, a sweating sensor that detects a sweat volume of the user 1 may be used as the biological sensor 22.

Furthermore, a heartbeat sensor (a pulse sensor) that detects a heart rate (a pulse rate) of the user 1 may be used as the biological sensor 22.

Further, an eyeball sensor that detects an amount of a movement of eyeballs of the user 1 may be used as the biological sensor 22. The eyeball sensor is, for example, a camera that is mounted on the base 11 of the HMD 10 so that an image of an eyeball of the user 1 can be captured. Alternatively, a sensor or the like that detects a difference in potential between the eyes of the user 1 may be used as the eyeball sensor.

Furthermore, an electrocardiogram sensor that detects an electrocardiogram waveform of the user 1 may be used as the biological sensor 22. The use of an electrocardiogram sensor makes it possible to detect, for example, a state of an autonomic nerve of the user 1.

Moreover, a specific configuration of the biological sensor 22 is not limited, and a sensor that can detect any biological information such as a body temperature or a blood oxygen level of the user 1 may be used.

The external camera 23 is an image-capturing element that is arranged around the user 1 to capture an image of the user 1 who is viewing video content. A video that is captured by the video external camera 23 is used for, for example, motion capturing that is detecting a pose and a movement of the user 1 and gesture input performed by the user 1. Further, body shaking or the like of the user 1 may be detected in the video captured by the external camera 23.

The microphone 24 is a sound collecting element that collects sound produced by the user 1. Typically, the microphone 24 is included in the HMD 10. However, for example, a stationary microphone 24 or the like may be used. Sound of the user 1 that is detected by the microphone 24 is used for, for example, a conversation in the video content and sound input. Further, the details of sound are used to estimate, for example, feelings and a health state of the user 1.

The stimulus provision section 25 includes an element that provides a stimulus to the user 1, that is, an element that causes a stimulus that the user 1 can feel. Each element included in the stimulus provision section 25 is provided to, for example, a device (such as the HMD 10 or the controller 20) that is used by the user 1, or a device that is arranged around the user 1.

In the present embodiment, the stimulus provision section 25 provides a stimulus (hereinafter referred to as a suppression stimulus) used to suppress a visually induced motion sickness.

A dedicated element used to cause a suppression stimulus, or an element that causes a stimulus (hereinafter referred to as a content stimulus) that is provided as a portion of video content, may be used as the stimulus provision section 25. Examples of the content stimulus include a vibration stimulus that is provided along with a video including explosion. A suppression stimulus used to suppress a visually induced motion sickness may be provided using an element that causes such a content stimulus.

In the present embodiment, a vibration element 26 that provides a vibration stimulus to the user 1 is used as the stimulus provision section 25. An element, such as an eccentric motor or a voice coil motor (VCM), that can generate vibration is used as the vibration element 26.

A and B of FIG. 1 each schematically illustrate a plurality of vibration elements 26 provided to the content provision system 100 and the HMD 10 using regions with dots.

For example, four vibration elements 26a to 26d are provided to the HMD 10 and used as the stimulus provision sections 25, as illustrated in B of FIG. 1. The vibration element 26a is arranged in the middle of a front portion of the base 11 and provides vibration to the front of the head of the user 1. The vibration elements 26b and 26c are respectively arranged in left and right portions in which the base 11 and the side-of-head band 12a are connected to each other, and respectively provide vibration to the left and right sides of the head of the user 1. The vibration element 26d is arranged in the middle of a back portion of the side-of-head band 12a and provides vibration to the back of the head of the user 1.

Further, in the content provision system 100, a vibration element 26e included in the controller 20 is used as the stimulus provision sections 25, as illustrated in A of FIG. 1. The vibration element 26e provides vibration to the palm of the hand of the user 1.

Furthermore, a vibration element 26f is worn on an arm of the user 1, and a vibration element 26g is worn on a leg of the user 1. The vibration elements 26f and 26g respectively provide vibration to the arm and leg of the user 1. Further, a vibration element 26h is provided to a seating surface of the chair 5 in which the user 1 is seated, and a vibration element 26i is provided to a backrest of the chair 5. The vibration elements 26h and 26i respectively provide vibration to buttocks and a back of the user 1. The vibration elements 26f to 26i are also used as the stimulus provision sections 25.

A vibration stimulus provided by the vibration element 26 is an example of a tactile-sense stimulus from among stimuli that the user 1 feels. The stimulus provision section 25 may be capable of providing a tactile-sense stimulus other than a vibration stimulus. For example, a tactile-sense element that can provide a pressure-sense stimulus, a cooling element or a heating element that can provide, for example, a hot-and-cold stimulus, or the like may be used as the stimulus provision section 25.

Further, an electric stimulus element 27 that provides an electric stimulus to the user 1 may be used as the stimulus provision section 25.

For example, a GVS element that causes galvanic vestibular stimulation (GVS) to act on the user 1 is used as the electric stimulus element 27. The GVS corresponds to a stimulus that artificially provides an acceleration sensation or a sense of balance by a very small current being supplied to a vestibular organ that governs a sense of balance. For example, the GVS element includes an electrode that provides an electric stimulus to a portion behind an ear. The GVS element is provided to, for example, a speaker of the HMD 10.

Moreover, an element or the like that provides, for example, a myoelectric stimulus or a low-frequency electric stimulus may be used as the electric stimulus element 27.

Further, a speaker 28 that provides a sound stimulus to the user 1 may be used as the stimulus provision section 25. For example, headphone elements that are provided to the HMD 10 to cover left and right ears of the user 1 are used as the speaker 28. Further, an external speaker or the like that is provided separately from the HMD 10 may be used as the speaker 28.

Further, an element that provides a light stimulus to the user 1 may be used as the stimulus provision section 25. For example, a light stimulus can be provided to the user 1 using the display unit 13 of the HMD 10. In this case, the display unit 13 serves as the stimulus provision section 25 providing a light stimulus. Further, for example, a light source that emits visible light may be provided around the display unit 13.

A configuration of the stimulus provision section 25 is not limited, and it is sufficient if a plurality of elements from among the elements described above, or one of the elements described above may be provided to the content provision system 100. These elements provide a suppression stimulus to the user 1 who is viewing video content. As described above, the suppression stimuli provided to the user 1 by the stimulus provision section 25 include at least one of a vibration stimulus, an electric stimulus, a sound stimulus, or a light stimulus.

The storage 30 is a nonvolatile storage device, and, for example, a solid state drive (SSD) or a hard disk drive (HDD) is used as the storage 30. Moreover, any non-transitory computer-readable recording medium may be used.

As illustrated in FIG. 2, the storage 30 stores therein a control program 31, a content database 32, a user database 33, and a stimulus database 34.

The control program 31 is a program that controls an operation of the overall content provision system 100 including, for example, the HMD 10 and the stimulus provision section 25.

The content database 32 stores therein data related to video content that is viewed by the user 1. The data related to video content includes, for example, video data, graphic data, and sound data that are used for reproduction in video content, as well as an application program used to advance video content.

Further, the content database 32 stores therein content characteristic information that indicates visually-induced-motion-sickness-related characteristics of video content. It can be said that, for example, the content characteristic information is information that has recorded therein, for example, a degree of easily causing a motion sickness (a rate of causing a motion sickness) due to video content and is visually-induced-motion-sickness-related static information regarding video content. The content characteristic information will be described in detail later with reference to, for example, FIG. 5.

The user database 33 stores therein user characteristic information that indicates visually-induced-motion-sickness-related characteristics of the user 1. It can be said that, for example, the user characteristic information is information that records therein visually-induced-motion-sickness-related characteristics of the user 1 himself/herself and is visually-induced-motion-sickness-related static information regarding the user 1. Examples of the visually-induced-motion-sickness-related characteristics include a symptom of a visually induced motion sickness, the type of video that easily causes a motion sickness, and a timing at which a motion sickness is caused. Further, for example, information that specifies a suppression stimulus that makes it possible to effectively suppress a visually induced motion sickness of the user 1 may be recorded.

Further, in the present embodiment, history information that records therein a visually induced motion sickness experienced by a user in the past is stored as the user characteristic information. The user characteristic information and the history information will be described in detail later with reference to, for example, FIG. 6.

The stimulus database 34 stores therein data related to a suppression stimulus provided by the stimulus provision section 25. For example, IDs are respectively assigned to stimuli of a plurality of suppression stimuli. The type of stimulus and a parameter for a stimulus are recorded for each suppression stimulus labeled with a corresponding one of the IDs. Examples of data related to a vibration stimulus include information that specifies the vibration element 26; and information that specifies parameters such as an amplitude of vibration, a frequency of vibration, and a vibration pattern.

The use of the stimulus database 34 makes it possible to easily deal with various suppression stimuli.

The information processing apparatus 40 controls operations of respective blocks of the content provision system 100. The information processing apparatus 40 may be included in the HMD 10 or may be an external apparatus separate from the HMD 10. The information processing apparatus 40 is configured by hardware, such as a CPU and a memory (a RAM and a ROM), that is necessary for a computer. Various processes are performed by the CPU loading, into the RAM, the control program 31 stored in the storage 30 and executing the control program 31.

For example, a programmable logic device (PLD) such as a field programmable gate array (FPGA), or another device such as an application specific integrated circuit (ASIC) may be used as the information processing apparatus 40.

In the present embodiment, a content processor 41, a content information acquiring section 42, a user information acquiring section 43, a section 44 for estimating and predicting a motion sickness state, and a stimulus controller 45 are implemented as functional blocks by the CPU of the information processing apparatus 40 executing the control program 31 according to the present embodiment. Then, an information processing method according to the present embodiment is performed by these functional blocks. Note that, in order to implement each functional block, dedicated hardware such as an integrated circuit (IC) may be used as appropriate.

The content processor 41 executes video content. For example, the content processor 41 executes an application program stored in the content database 32 and generates, using video data and graphic data, data of a moving image that forms a scene of video content on a screen. The generated moving-image data is output to the display unit 13 of the HMD 10 as appropriate. Further, the content processor 41 reads information regarding an input operation performed by the user 1 and output by the controller 20, and advances video content in response to the input operation performed by the user.

The content information acquiring section 42 acquires visually-induced-motion-sickness-related information regarding video content. Specifically, content characteristic information that indicates visually-induced-motion-sickness-related characteristics of video content, and content state information that indicates a visually-induced-motion-sickness-related state of video content are acquired.

The content characteristic information is read as appropriate from the content database 32 described above.

The content state information is information that indicates a state of video content that is being played back (such as a speed of changing the background, the number of items, the number of characters, and the brightness of a screen). These pieces of information are referred to when, for example, a degree of easily causing a motion sickness (a rate of causing a motion sickness) due to video content is estimated. It can be said that the content state information is visually-induced-motion-sickness-related dynamic information regarding video content.

For example, an ID of a scene that is being played is acquired from the content processor 41, and information that indicates a state of the scene (such as a speed of changing the background) is read on the basis of the ID of the scene. Alternatively, the information indicating a state of a scene that is being played may be read directly from the content processor 41.

Further, output from the sensor section 21 may be read as the content state information. For example, a change in a pose of the user 1 may be detected in a video captured by the external camera 23 to estimate, for example, a speed of changing the background. Alternatively, when, for example, an external speaker is used, a change in surround sound, or the like may be estimated from sound detected by the microphone 24.

As described above, the content processor 41 and the sensor section 21 serve as content sensors that output content state information.

The user information acquiring section 43 acquires visually-induced-motion-sickness-related information regarding the user 1. Specifically, user characteristic information that indicates visually-induced-motion-sickness-related characteristics of the user 1, and user state information that indicates a visually-induced-motion-sickness-related state of the user 1 are acquired.

The user characteristic information is read as appropriate from the user database 33 described above.

The user state information is information regarding a state of the user 1 who is viewing video content, and is referred to when a state of a visually induced motion sickness of the user 1 is estimated or predicted. It can be said that the user state information is visually-induced-motion-sickness-related dynamic information regarding the user 1.

The user state information includes biological information regarding the user 1. For example, information regarding, for example, a sweat volume and a heart rate of the user 1 that are detected by the biological sensor 22, and information regarding, for example, shaking of a body of the user 1 are read as the biological information, where an image of the body of the user 1 is captured by the external camera 23.

Further, operation information regarding an operation of the controller 20 that is performed by the user 1 may be read as the user state information. Examples of the operation information include information, such as a speed and timing at which the user 1 presses a button, that indicates a reaction of the user 1, and information that indicates, for example, an operation history (an operational log).

Further, speech information regarding a speech of the user 1 may be read as the user state information from sound of the user 1 that is detected using the microphone 24. The speech information is, for example, data that indicates details of speech of the user 1 during viewing video content.

Furthermore, report information that is reported by the user 1 himself/herself may be read as the user state information. The report information is data of a response of the user 1 to, for example, a question about, for example, a health state.

Moreover, any information that can indicate a state of the user 1 during viewing video content may be used as the user state information.

The section 44 for estimating and predicting a motion sickness state acquires visually-induced-motion-sickness information that indicates a state of a visually induced motion sickness of the user 1 who is viewing video content.

The visually induced motion sickness corresponds to poor health including, for example, nausea, headache, and dizziness that are caused due to the user 1 viewing video content. A degree and the type of the poor health differ for each user 1, and also differ depending on the video content.

From a subjective point of view of the user 1, a state of a visually induced motion sickness refers to a symptom that the user 1 feels during viewing video content and to a degree of the symptom. Note that there may be a change in, for example, sweating and a heart rate of the user 1 even when the user 1 is not aware of a symptom. This state is a state in which a sign of a visually induced motion sickness is shown, and is one of the states of a visually induced motion sickness of the user 1.

The visually-induced-motion-sickness information acquired by the section 44 for estimating and predicting a motion sickness state is information that objectively indicates a state of a visually induced motion sickness of the user 1 using parameters such as a numerical value and the type, as described above.

For example, the visually-induced-motion-sickness information includes the following items indicating states of a visually induced motion sickness of the user 1.

A degree of a visually induced motion sickness of the user 1

The type of a change in a degree of a visually induced motion sickness of the user 1

A symptom of a visually induced motion sickness of the user 1

The type of a change in a symptom of a visually induced motion sickness of the user 1

For example, the degree of visually induced motion sickness corresponds to a parameter that indicates, in a plurality of stages, the extent of an increase in a degree of a visually induced motion sickness (refer to FIG. 3). Alternatively, a parameter that indicates the extent of an increase in a degree of a visually induced motion sickness using a numerical value (such as using %) may be used.

For example, the type of change in a degree of visually induced motion sickness is the type of how a degree of a visually induced motion sickness increases (such as the type of person showing a gradual increase in a degree of motion sickness and the type of person showing a rapid increase in a degree of motion sickness).

For example, the symptom of visually induced motion sickness is a symptom of poor health (including headache, dizziness, and nausea) of which the user 1 is aware due to visually induced motion sickness.

For example, the type of change in a symptom of a visually induced motion sickness is the type of how a degree of symptom increases (such as the type of person who has headache first and then feels nauseous, and the type of person who has headache and feels dizzy at the same time).

In the present embodiment, the visually-induced-motion-sickness information includes at least one of information obtained by estimating a state of a visually induced motion sickness of the user 1 who is viewing video content, or information obtained by predicting the state of the visually induced motion sickness.

Here, the information obtained by estimating a state of a visually induced motion sickness (hereinafter referred to as estimation information) is information that indicates a state of a visually induced motion sickness of the user 1 at a current point in time. Further, the information obtained by predicting a state of a visually induced motion sickness (hereinafter referred to as prediction information) is information that indicates a state of a visually induced motion sickness of the user 1 at a point in time that is after the current point in time, that is, information that indicates a state of a visually induced motion sickness of the user 1 in the future.

As described above, the section 44 for estimating and predicting a motion sickness state acquires at least one of the estimation information indicating a current state of a visually induced motion sickness, or the prediction information indicating a future state of a visually induced motion sickness.

In the present embodiment, the section 44 for estimating and predicting a motion sickness state performs estimation processing of estimating a state of a visually induced motion sickness of the user 1, on the basis of at least one of the user state information, user characteristic information, content state information, or content characteristic information described above. The estimation information obtained by estimating a state of a visually induced motion sickness of the user 1 is generated by performing the estimation processing.

For example, a current degree of visually induced motion sickness and a current type of symptom are estimated by the estimation processing. Further, for example, the type of a change in a degree of visually induced motion sickness and the type of a change in symptom may be estimated. Moreover, for example, whether a visually induced motion sickness has been caused may be estimated.

Further, in the present embodiment, the section 44 for estimating and predicting a motion sickness state performs prediction processing of predicting a state of a visually induced motion sickness of the user 1, on the basis of at least one of the user state information, user characteristic information, content state information, or content characteristic information described above. The prediction information obtained by predicting a state of a visually induced motion sickness of the user 1 is generated by performing the prediction processing.

For example, a degree of visually induced motion sickness and the type of symptom at a point in time that is after a current point in time are predicted by the prediction processing. For example, a predicted value obtained after the elapse of a specified period of time (such as in one minute, in three minutes, or in five minutes) may be calculated, or, for example, a period of time that elapses before a predicted value reaches a specified threshold or a period of time that elapses before an awareness of a symptom may be predicted.

Note that one of the estimation processing and the prediction processing may be performed. In this case, one of the estimation information and the prediction information is generated as visually-induced-motion-sickness information.

As described above, the section 44 for estimating and predicting a motion sickness state performs at least one of the estimation processing or the prediction processing to generate visually-induced-motion-sickness information. The estimation processing and prediction processing performed by the section 44 for estimating and predicting a motion sickness state will be specifically described in detail later.

In the present embodiment, the section 44 for estimating and predicting a motion sickness state corresponds to an acquisition section that acquires visually-induced-motion-sickness information.

The stimulus controller 45 controls provision of a suppression stimulus to the user 1, on the basis of visually-induced-motion-sickness information. In other words, on the basis of a state of a visually induced motion sickness that is estimated or predicted by the section 44 for estimating and predicting a motion sickness state, the stimulus controller 45 controls a method for providing a stimulus (a suppression stimulus), such as a vibration stimulus or an electric stimulus, that is used to decrease a degree of visually induced motion sickness, and controls details about the stimulus.

Specifically, the stimulus controller 45 controls at least one of a timing of providing a suppression stimulus, a continuation period of time for which the suppression stimulus is provided continuously, a parameter for the suppression stimulus, or the type of the suppression stimulus, on the basis of visually-induced-motion-sickness information (the estimation information or the prediction information).

For example, the timing of providing a suppression stimulus, the continuation period of time, the type of the suppression stimulus, and the like are set on the basis of visually-induced-motion-sickness information. Further, for example, data stored in the stimulus database 34 is used as the parameter for a suppression stimulus. Of course, the parameter for a suppression stimulus may be set individually.

On the basis of the information described above, the stimulus controller 45 generates a signal used to provide a suppression stimulus, and outputs the generated signal to respective elements included in the stimulus provision section 25.

It is assumed that, for example, a vibration stimulus is used as the suppression stimulus. In this case, a vibration stimulus is provided multiple times in order to suppress a visually induced motion sickness of the user 1. Here, for example, a timing of driving the vibration element 26 (a timing of providing a vibration stimulus), and a period of time for which the vibration element is driven (a continuation period of time for which the vibration element is driven continuously) are set as appropriate according to a state of a visually induced motion sickness. Further, an intensity, a period, a waveform, and the like of a signal applied to the vibration element 26 are set as appropriate to control an intensity, a frequency, a pattern, and the like of a vibration stimulus. Furthermore, a tactile-sense stimulus other than a vibration stimulus, an electric stimulus, a sound stimulus, a light stimulus, or the like is set as a suppression stimulus as appropriate according to a state of a visually induced motion sickness.

As described above, in the information processing apparatus 40, a state of a visually induced motion sickness of the user 1 is estimated or predicted on the basis of a state of video content or a state of the user 1, and provision of a suppression stimulus used to decrease a degree of visually induced motion sickness is controlled on the basis of a result of the estimation or prediction. This makes it possible to effectively provide a stimulus according to a state of the user 1, and thus to sufficiently suppress the visually induced motion sickness.

[Degree of Visually Induced Motion Sickness]

In the present embodiment, the section 44 for estimating and predicting a motion sickness state acquires, as visually-induced-motion-sickness information, degree information that includes at least one of information obtained by estimating a degree of a visually induced motion sickness of the user 1, or information obtained by predicting the degree of the visually induced motion sickness.

Specifically, estimation information obtained by estimating a degree of visually induced motion sickness, and prediction information obtained by predicting a degree of visually induced motion sickness are respectively generated by estimation processing and prediction processing.

The estimation processing of estimating a degree of visually induced motion sickness is primarily described below.

[Estimation and Prediction of Degree of Visually Induced Motion Sickness Using User State Information]

FIG. 3 illustrates an example of a determination table for a degree of a visually induced motion sickness of the user 1. FIG. 3 illustrates a determination table used to determine a degree of visually induced motion sickness using user state information (here, a "controller operation", "sweating", and a "heart rate variability") that is acquired by the user information acquiring section 43.

In the table, a parameter that indicates a current state of the user 1 is evaluated using, as a reference, a parameter indicating a state of the user 1 in a steady state (that is, a state in which the user 1 does not have a visually induced motion sickness), and a degree of visually induced motion sickness is determined (estimated).

For example, a measurement value obtained when the user 1 views content with a low-degree motion sickness factor is used as the parameter in a steady state.

Further, when the video content is game content, a parameter used as a reference may be measured for each genre of game (such as a shooting game, an action game, or a puzzle game).

Further, a parameter measured for a period of time other than a period of time for which a game is being played may be used as the parameter in a steady state. For example, a parameter measured for, for example, a period of time from a log-in to a start of the game or a period of time for which various settings are performed is used as the parameter in a steady state. This makes it possible to accurately determine a degree of visually induced motion sickness on the basis of information obtained just before a visually induced motion sickness is caused.

In the example illustrated in FIG. 3, degrees of visually induced motion sickness are classified into four levels that are Level 1 to Level 4.

Level 1 indicates a state in which the user 1 does not get motion sickness at all.

Level 2 indicates a state in which there is a sign of a visually induced motion sickness with the user 1, and indicates, for example, a state in which the user 1 is not aware of a symptom of a visually induced motion sickness but there is a change in physical condition.

Level 3 indicates a state in which the user 1 starts getting motion sickness, and indicates, for example, a state in which the user 1 starts getting aware of the symptom of a visually induced motion sickness.

Level 4 indicates a state in which the user 1 has a visually induced motion sickness, and indicates, for example, a state in which the user 1 has a more severe symptom of a visually induced motion sickness, compared to the state indicated by Level 3.

In the item of the "controller operation", an operation of the controller 20 that is currently performed by the user 1, and a steady-state operation are compared. For example, a timing at which an operation is performed by the user 1 and that is read when the estimation processing is performed, and the accuracy in the operation are compared with the timing and operation accuracy in a steady-state operation.

For example, the degree of visually induced motion sickness is determined to be at Level 1 when the operation of the controller 20 is similar to the steady-state operation predicted from a history (for example, a variation of less than 3%).

Further, the degree of visually induced motion sickness is determined to be at Level 2 when the operation of the controller 20 varies from the steady-state operation by greater than or equal to 3% and less than 5%.

Furthermore, the degree of visually induced motion sickness is determined to be at Level 3 when the operation of the controller 20 varies from the steady-state operation by greater than or equal to 5% and less than 10%.

Further, the degree of visually induced motion sickness is determined to be at Level 4 when the operation of the controller 20 varies from the steady-state operation by greater than or equal to 10%.

Information regarding a steady-state operation is set on the basis of, for example, a history of an operation of, for example, a game played by the user 1 in the past. For example, the operation history is read as user characteristic information as appropriate.

Further, in the item of the "controller operation", the information regarding a steady-state operation may be set on the basis of a history of an operation of a genre of game that is similar to a genre of a game (video content) that is being played by the user 1, or a history of an operation of a game that is similar to the game (video content) being played by the user 1. This makes it possible to estimate a degree of visually induced motion sickness properly even when an operation style of the user 1 is changed according to the genre.

Information regarding an operation of the controller 20 that is performed by the user 1 is an example of operation information regarding an operation performed by a user. Note that a degree of visually induced motion sickness can also be estimated using information that records therein details of an operation of the controller 20 that is performed by the user 1. For example, a history of an operation of pausing video content, and a record for, for example, a period of time for which the user 1 does not perform operation are represented by logs that record therein stop of video content. Such logs are referred to, and the degree of visually induced motion sickness is determined to be higher if video content is stopped more often.

Returning to FIG. 3, in the item of "sweating", a current sweat volume of the user 1 and a sweat volume in the steady state are compared. It can be said that this is processing of evaluating emotionally induced sweating of the user 1 due to visually induced motion sickness.

For example, the degree of visually induced motion sickness is determined to be at Level 1 when a sweat volume of the user 1 exhibits a change of less than 3%, compared with a sweat volume in the steady state.

Further, the degree of visually induced motion sickness is determined to be at Level 2 when the sweat volume of the user 1 exhibits a change of greater than or equal to 3% and less than 5%, compared with the sweat volume in the steady state.

Furthermore, the degree of visually induced motion sickness is determined to be at Level 3 when the sweat volume of the user 1 exhibits a change of greater than or equal to 5% and less than 10%, compared with the sweat volume in the steady state.

Further, the degree of visually induced motion sickness is determined to be at Level 4 when the sweat volume of the user 1 exhibits a change of greater than or equal to 10%, compared with the sweat volume in the steady state.

In the item of the "heart rate variability", a current amount of variation of a heart rate of the user 1 (the heart rate variability) and an amount of variation of a heart rate in a steady state (the heart rate variability in the steady state) are compared.

For example, the degree of visually induced motion sickness is determined to be at Level 1 when the variability of a heart rate of the user 1 exhibits a change of less than 3%, compared with the heart rate variability in the steady state.

Further, the degree of visually induced motion sickness is determined to be at Level 2 when the variability of a heart rate of the user 1 exhibits a change of greater than or equal to 3% and less than 5%, compared with the heart rate variability in the steady state.

Furthermore, the degree of visually induced motion sickness is determined to be at Level 3 when the variability of a heart rate of the user 1 exhibits a change of greater than or equal to 5% and less than 10%, compared with the heart rate variability in the steady state.

Further, the degree of visually induced motion sickness is determined to be at Level 4 when the variability of a heart rate of the user 1 exhibits a change of greater than or equal to 10%, compared with the heart rate variability in the steady state.

Information regarding a sweat volume and a heart rate (the heart rate variability) of the user 1 is an example of the biological information regarding the user 1.

Moreover, an amount of a movement of eyeballs of the user 1 may be used as the biological information. For example, the degree of visually induced motion sickness is determined to be higher if the amount of a movement of eyeballs is larger or if the movement is performed more often.

Further, body shaking of the user 1 may be used as the biological information. For example, the degree of visually induced motion sickness is determined to be higher if a head or the entirety of a body of the user 1 shakes more greatly.

Further, an electrocardiogram waveform of the user 1 may be used as the biological information. The use of an electrocardiogram waveform makes it possible to detect, for example, a modulation of an autonomic nerve (a sympathetic nerve and a parasympathetic nerve) of the user 1. The degree of visually induced motion sickness is determined to be higher if the modulation of the autonomic nerve is larger.

Specific details of the biological information are not limited, and the degree of visually induced motion sickness is estimated using one of the parameters described above or using a plurality of the parameters described above in combination.

User state information other than the operation information and biological information described above may be used.

For example, speech information regarding speech of the user 1 is used as the user state information. In this case, the degree of visually induced motion sickness is estimated from details of speech freely provided by the user 1 during viewing video content, or from how often the speech is provided. For example, the degree of visually induced motion sickness is determined to be higher if speech, such as "feeling bad", "starting getting a motion sickness", "feeling dizzy", or "having a headache", that indicates that the user is in poor health is provided more often.

Further, a state of sound itself of the user 1 may be used as the user state information. In this case, the sound of the user 1 is analyzed using, for example, frequency analysis. On the basis of a result of the analysis, whether a state of a voice of the user 1 departs from a steady state is detected. Further, a degree of the departing of the voice of the user 1 may be detected. For example, in the case in which a tone of voice of the user 1 departs from a usual tone, the degree of visually induced motion sickness is determined to be higher if an extent of the departing is higher or if a period of time for which the tone of voice of the user 1 departs from the usual tone is longer.

Further, for example, report information regarding a report of the user 1 may be used as the user state information. For example, a simple question that is addressed to the user 1 about the degree of visually induced motion sickness is provided to the user 1 using a video or sound. In this case, the user 1 estimates his/her motion sickness state in stages, and a result of the estimation is input verbally or using a button. Then, the result is read as a degree of visually induced motion sickness. The degree of visually induced motion sickness can be estimated with a high degree of accuracy by using information reported by the user 1, as described above.

Further, the motion sickness state of the user 1 himself/herself may be rated using a timing such as a timing after experiencing video content, or a timing after completion of each scene. In this case, for example, an estimation screen used to rate a visually induced motion sickness is displayed on the display unit 13.

The degree of a visually induced motion sickness of the user 1 is rated on the estimation screen using an estimation approach that is called the Simulator Sickness Questionnaire (SSQ).

In the SSQ, an approach of responding to the following question items with four levels (0: None, 1: Slight, 2: Moderate, 3: Severe) is adopted.

"1: General discomfort", "2: Fatigue", "3: Headache", "4: Eye strain", "5: Difficulty focusing", "6: Increased salivation", "7: Sweating", "8: Nausea", "9: Difficulty concentrating", "10: Fullness of head", "11: Blurred vision", "12: Dizzy (eyes open)", "13: Dizzy (eyes closed)", "14: Vertigo", "15: Stomach awareness", and "16: Burping".

Further, in the SSQ, sub-scores including Total score, Nausea, Oculomotor, and Disorientation are evaluated from a result of the response to those question items.

Note that simpler question items (including "feeling bad?", "feeling dizzy?", "having a headache?", and "feeling nauseous?") may be used instead of such SSQ.

As described above, information rated by the user 1 is accumulated in the user database 33 as a history regarding a visually induced motion sickness of the user 1 along with, for example, history information described later.

The estimation processing of estimating a current degree of visually induced motion sickness has been primarily described above on the basis of user state information.

The prediction processing of predicting a future degree of visually induced motion sickness can be performed on the basis of user state information. For example, when there is a change in user state information, a degree of visually induced motion sickness after the elapse of a specified period of time is predicted on the basis of, for example, a rate of the change.

For example, it is assumed that a sweat volume of a user is gradually increasing. In this case, a sweat volume after the elapse of a specified period of time is calculated using, for example, a fitted curve that indicates an increase in sweat volume, and a degree of visually induced motion sickness after the elapse of the specified period of time is predicted on the basis of a result of the calculation. For example, a point in time at which the degree of visually induced motion sickness is changed to the next level may be predicted from the increase in sweat volume. Likewise, the degree of visually induced motion sickness can be predicted as appropriate using, for example, a change in other biological information.

Moreover, a method for predicting a degree of visually induced motion sickness using user state information is not limited.

[Characteristics Regarding Ease of Causing Motion Sickness Due to Video Content]

FIG. 4 is a set of tables in which an example of content state information regarding video content is given. FIG. 5 is a table in which an example of content characteristic information regarding video content is given. Characteristics regarding ease of causing a motion sickness due to video content are described below with reference to FIGS. 4 and 5.

The ease of causing a motion sickness due to video content refers to typical ease of causing a motion sickness due to video content, and refers to characteristics determined according to properties of video content. It is considered that a visually induced motion sickness that the user 1 gets during viewing video content is caused due to various factors related to video content. These factors for a visually induced motion sickness are referred to as motion sickness factors.

Typically, the motion sickness factor is a factor that indicates a physical state of a video and sound that are included in video content. For example, a change in a brightness of a video, a change in a speed of a background of the video, and a change in sound can be motion sickness factors. The section 44 for estimating and predicting a motion sickness state acquires information indicating ease of causing a motion sickness due to video content, the ease of causing a motion sickness due to video content being estimated on the basis of the motion sickness factors.

Examples of the motion sickness factor for a visually induced motion sickness include various factors.

For example, a factor related to the entirety of a screen or a background is used as a motion sickness factor. Examples of such a factor include an average brightness of a screen, a variation in brightness of each portion of a screen, a degree of a change in background for a certain period of time, a degree of a change in brightness of each portion for the certain period of time, a degree of a change in color for the certain period of time, and a speed at which a background is changed.

In this case, for example, a motion sickness is estimated to be more easily caused if the average brightness is higher or if the brightness varies more greatly. Further, the motion sickness is estimated to be more easily caused if, for example, a background is changed faster, the brightness is changed more greatly, or a color is changed more greatly.

Further, a factor related to an object displayed on a screen may be used as the motion sickness factor. Examples of such a factor include the number of objects displayed such as items or characters, a proportion of an object moving on a screen, a speed of the movement, a degree of a change in a color of each object relative to a screen, and a speed of the change.

In this case, the motion sickness is estimated to be more easily caused if the number of objects such as items or characters is larger, since this results in an increase in movement of a viewpoint of the user 1. Likewise, the motion sickness is estimated to be more easily caused if a proportion of a moving object is larger. Further, the motion sickness is estimated to be more easily caused if an object moves faster, a degree of a change in a color of the object is higher, or a speed of the change is higher.

Further, a factor related to a change in scene may be used as the motion sickness factor. Examples of such a factor include how often switching between scenes of video content is performed, and a degree of a change in changing scene.

In this case, the motion sickness is estimated to be more easily caused if switching between scenes is performed more often. Further, with respect to how to switch between scenes, the motion sickness is estimated to be more easily caused with a linearly moved field of view, compared to when the field of view is moved in stages due to switching between scenes being performed.

Not only a physical state of a video but also a change in sound, a change in tactile-sense stimulus, or the like can also be used to estimate ease of causing a motion sickness. For example, how often switching between magnitudes or the types of sound is performed, an amount of movement of surround sound, or an amount of a change in tactile-sense stimulus is used as a motion sickness factor.

In this case, the motion sickness is estimated to be more easily caused if switching between sounds is performed more often. Further, the motion sickness is estimated to be more easily caused with, for example, a larger amount of movement of surround sound or a greater change in tactile-sense stimulus.

As described above, a motion sickness is typically estimated to be more easily caused due to video content if there is a greater change in a physical state of a video and sound that are included in the video content.

The characteristics regarding ease of causing a motion sickness may be estimated in real time while the user 1 is viewing video content, or may be estimated in advance to be read as appropriate.

First, a method for estimating, in real time, characteristics regarding ease of causing a motion sickness, using information regarding a motion sickness factor is described.

Pieces of content state information that are respectively read at timings t1, t2, . . . are given in the table illustrated in A of FIG. 4, and characteristics regarding ease of causing a motion sickness due to video content that are respectively estimated at the timings t1, t2, . . . are given in the table illustrated in B of FIG. 4.

Values of Factor 1, Factor 2, . . . (such as a physical amount, or a degree of a change in the physical amount) are given in "Value of motion sickness factor" in the table about content state information in A of FIG. 4. For example, the value of Factor 1 is in a range of between 0 and 1, inclusive, and the value of Factor 2 is in a range of between 0 and 100, inclusive. Further, a scene of video content at each timing is determined, and the determined scene is associated with a scene ID (ID=A, B, C, . . . ). For example, t1 to t5 are associated with a scene A, t6 to t10 are associated with a scene B, and t11 to t15 are associated with a scene C.

In the section 44 for estimating and predicting a motion sickness state, the "value of a motion sickness factor" is read at each timing, as described above, and a degree of ease of causing a motion sickness due to video content is estimated according to a state of the motion sickness factor. Values corresponding to the degrees of ease of causing a motion sickness (here, with five levels including 0 to 4) that are estimated for Factor 1, Factor 2, . . . are given in "Ease of causing motion sickness" in the table about characteristics regarding ease of causing a motion sickness in B of FIG. 4.

For example, a value of Factor 1 is 0 at a timing t1, and thus a degree of ease of causing a motion sickness for Factor 1 is estimated to be 0 at the timing t1. On the other hand, a value of Factor 2 is 10, and thus a degree of ease of causing a motion sickness for Factor 2 is estimated to be 1. Here, a maximum value for the degrees of ease of causing a motion sickness for the respective factors is used as a comprehensive value for the degrees of ease of causing a motion sickness at a corresponding timing. A comprehensive value for the degrees of ease of causing a motion sickness is 1 at the timing t1.

Further, for example, a degree of ease of causing a motion sickness for Factor 1 is 4 at a timing t6, and a degree of ease of causing a motion sickness for Factor 2 is 2 at the timing t6. Thus, a comprehensive value for the degrees of ease of causing a motion sickness is 4 at the timing t6.

As described above, content state information includes information regarding a motion sickness factor for a visually induced motion sickness in video content that is being played back. The section 44 for estimating and predicting a motion sickness state estimates characteristics regarding ease of causing a motion sickness due to video content that is being played back, on the basis of the information regarding a motion sickness factor that is included in the content state information.

This makes it possible to estimate a degree of ease of causing a motion sickness due to video content with certainty even when, for example, a video or sound included in the video content is changed due to, for example, an operation performed by the user 1.

Next, a method for estimating a current degree of ease of causing a motion sickness using pre-estimated characteristics regarding ease of causing a motion sickness is described.

Content characteristic information obtained by recording characteristics regarding ease of causing a motion sickness for respective scenes A, B, C, . . . of video content, is given in the table illustrated in FIG. 5. The content characteristic information is, for example, information that is estimated on the basis of characteristics of video content before the user 1 actually experiences the video content. Here, characteristics regarding ease of causing a motion sickness for the scenes A, B, and C are respectively equal to the characteristics for the scenes A, B, and C in FIG. 4.

For example, characteristics regarding ease of causing a motion sickness (content state information) that are estimated in real time when the user 1 previously performs playing are recorded. This makes it possible to create content characteristic information. Further, for example, characteristics regarding ease of causing a motion sickness may be evaluated upon creation of video content.

In the example illustrated in FIG. 5, a comprehensive value for degrees of ease of causing a motion sickness, and a value corresponding to a degree of ease of causing a motion sickness for each factor are recorded for each scene. For example, only the comprehensive value for degrees of ease of causing a motion sickness may be recorded, or only a value corresponding to a degree of ease of causing a motion sickness may be recorded for each factor.

Further, the degree of ease of causing a motion sickness does not necessarily have to be recorded for each scene. For example, a representative value (such as an average or a maximum value) may be obtained from a value that corresponds to a degree of ease of causing a motion sickness and is determined for each scene, and the degree of ease of causing a motion sickness may be defined for each piece of content.

Those values are accumulated in the content database 32 and read as appropriate when the values are necessary for performing processing.

As described above, for each scene included in video content, or for the entirety of content, content characteristic information includes information regarding pre-estimated characteristics regarding ease of causing a motion sickness due to video content. The section 44 for estimating and predicting a motion sickness state reads the characteristics regarding ease of causing a motion sickness that are included in the content characteristic information, and acquires characteristics regarding ease of causing a motion sickness due to video content that is being played back.

In this processing, there is no need to actually estimate characteristics regarding ease of causing a motion sickness at each timing. This makes it possible to sufficiently reduce processing burdens.

[Estimation and Prediction of Degree of Visually Induced Motion Sickness Using Characteristics Regarding Ease of Causing Motion Sickness and History Information]

FIG. 6 is a table in which an example of history information regarding a visually induced motion sickness of the user 1 is given.

The history information is information obtained by recording a state of a visually induced motion sickness caused upon a previous viewing experience of a user, and characteristics regarding ease of causing a motion sickness due to the viewing experience, the state and characteristics being recorded in association with each other. The history information is stored in the user database 33 as user characteristic information.

Content (hereinafter referred to as experienced content) used when history information is recorded may be video content that is being experienced by the user 1, or may be completely different content.

Here, a method for estimating and predicting a degree of visually induced motion sickness using the characteristics regarding ease of causing a motion sickness and the history information that are described above is described.

FIG. 6 illustrates history information recorded at a specified time interval (here, at one-minute interval). The history information records therein, as a "motion sickness state" of the user 1, a degree of motion sickness state and whether each symptom has been caused. Note that symptom-related data is estimated to be recorded on the basis of, for example, a report by the user 1, details of speech freely provided by the user 1, and biological information regarding the user 1.

Further, the history information records therein, as "ease of causing a motion sickness" due to experienced content, a comprehensive value for degrees of ease of causing a motion sickness and a value corresponding to a degree of ease of causing a motion sickness for each factor.

In other words, it can be said that the history information is information obtained by recording user state information regarding a state of a user during user's viewing experienced content and content state information regarding a state of content during user's viewing experienced content.

For example, the type of a change in a degree of visually induced motion sickness can be read from the item of "motion sickness state" in the history information. In the example illustrated in FIG. 6, the degree of visually induced motion sickness reaches Level 2 four minutes after start of experience, and the user 1 shows a sign of a visually induced motion sickness. Immediately afterward, the degree of visually induced motion sickness reaches Level 3 five minutes after the start of experience, and the user 1 starts getting a motion sickness. Then, the degree of visually induced motion sickness reaches Level 4 fourteen minutes after the start of experience. Thus, it can be said that this user 1 is the type of person who shows a sign of a visually induced motion sickness for a short period of time and shows a symptom of the visually induced motion sickness that gradually becomes severer.

History information recorded for various video content is accumulated in the user database 33. The section 44 for estimating and predicting a motion sickness state estimates or predicts a degree of visually induced motion sickness on the basis of the accumulated history information.

For example, a learner is created that learns a correlation between a degree of a visually induced motion sickness of the user 1 and characteristics regarding ease of causing a motion sickness due to content using history information regarding a visually-induced-motion-sickness state of the user 1 as training data. An algorithm used for the learner is not limited, and any machine learning algorithm may be used. Characteristics regarding ease of causing a motion sickness due to video content that is being played back are input to the learner to estimate a current degree of a visually induced motion sickness of the user 1. Further, the learner is created as appropriate, and this makes it possible to predict, for example, a degree of visually induced motion sickness after the elapse of a specified period of time, and a timing at which the degree of visually induced motion sickness is changed.

Note that processing of estimating or predicting a degree of visually induced motion sickness may be performed using a rule-based algorithm or the like, instead of the approach of machine learning.

In the present embodiment, the section 44 for estimating and predicting a motion sickness state generates visually-induced-motion-sickness information (estimation information regarding estimation of a degree of visually induced motion sickness and prediction information regarding prediction of a degree of visually induced motion sickness) on the basis of characteristics regarding ease of causing a motion sickness due to video content that is being played back and on the basis of history information, as described above.

This makes it possible to estimate a degree of a visually induced motion sickness that the user 1 gets due to video content, using characteristics of the user 1 and characteristics of video content, and thus to greatly improve the accuracy in estimating a degree of visually induced motion sickness.

The degree of a visually induced motion sickness of the user 1 may be estimated or predicted from characteristics regarding ease of causing a motion sickness due to video content without using user characteristic information (such as history information). In this case, characteristics regarding ease of causing a motion sickness that are estimated from content state information, and characteristics regarding ease of causing a motion sickness that are recorded as content characteristic information are referred to as appropriate when the estimation processing or the prediction processing is performed.

For example, a current degree of a visually induced motion sickness of the user 1 is estimated to be higher if a degree of ease of causing a motion sickness of characteristics regarding ease of causing a motion sickness due to a scene that is being played is higher. Further, for example, a degree of a visually induced motion sickness of the user 1 when a scene that is to be played in the future is predicted to be higher if a degree of ease of causing a motion sickness of characteristics regarding ease of causing a motion sickness due to the scene is higher. This makes it possible to estimate or predict a degree of a visually induced motion sickness of the user 1 even when, for example, history information regarding the user 1 is not used since the history information is not accumulated.

Further, a degree of a visually induced motion sickness of the user 1 may be estimated or predicted from user characteristic information without using characteristics regarding ease of causing a motion sickness. For example, the type of a change in a degree of visually induced motion sickness is determined from user characteristic information. Then, on the basis of the determined type of a change in a degree of visually induced motion sickness, a degree of visually induced motion sickness is estimated or predicted from, for example, a period of time for which video content is viewed (the time elapsed).

Moreover, specific details of processing of estimating a degree of visually induced motion sickness and processing of predicting the degree of visually induced motion sickness are not limited. Any processing of estimating or predicting a degree of visually induced motion sickness may be performed on the basis of, for example, at least one of user state information, user characteristic information, content state information, or content characteristic information, or on the basis of a combination thereof.

[Estimation and Prediction of Symptom of Visually Induced Motion Sickness]

The method for estimating a degree of a visually induced motion sickness of the user 1 has been primarily described above. Not only the degree of visually induced motion sickness, but also what kind of symptom of a visually induced motion sickness is caused can be estimated or predicted.

In the present embodiment, the section 44 for estimating and predicting a motion sickness state acquires, as visually-induced-motion-sickness information, symptom information that includes at least one of information obtained by estimating a symptom of a visually induced motion sickness of the user 1, or information obtained by predicting the symptom of the visually induced motion sickness.

Specifically, estimation information and prediction information are respectively generated by the estimation processing and the prediction processing, the estimation information being obtained by estimating a symptom of a visually induced motion sickness of the user 1, the prediction information being obtained by predicting the symptom of the visually induced motion sickness.

For example, a learner is created that learns a correlation between a symptom of a visually induced motion sickness of the user 1 and characteristics regarding ease of causing a motion sickness due to content using the history information described with reference to, for example, FIG. 6 as training data. The learner is configured to estimate a current symptom of a visually induced motion sickness of the user 1 in response to input, to the learner, characteristics regarding ease of causing a motion sickness due to video content that is being played back. Further, the learner is created as appropriate, and this also makes it possible to predict, for example, a symptom of a visually induced motion sickness after the elapse of a specified period of time, and a timing at which the symptom of visually induced motion sickness is changed.

Note that processing of estimating or predicting a symptom of visually induced motion sickness may be performed using a rule-based algorithm or the like, instead of the approach of machine learning.

Further, a symptom of a visually induced motion sickness may be estimated on the basis of user state information (such as biological information, operation information, speech information, and report information). For example, whether headache, dizziness, nausea, or the like has been caused is estimated on the basis of output from each biological sensor 22 and output from the external camera 23. Alternatively, a symptom of a visually induced motion sickness is estimated from details of speech of the user 1.

Not only information regarding a symptom of a visually induced motion sickness of the user 1 but also information regarding how the symptom of the visually induced motion sickness is changed (the type of a change in a symptom of a visually induced motion sickness) can also be estimated.

For example, the type of a change in a symptom of a visually induced motion sickness can be read from the item of "motion sickness state" in the history information illustrated in FIG. 6. In the example illustrated in FIG. 6, the user 1 starts feeling dizzy immediately after showing a sign of a visually induced motion sickness, and then the user 1 has a headache due to an increase in a degree of the symptom. Thus, it can be said that the user 1 is the type of person who has a headache after continuously feeling dizzy and shows a symptom of the visually induced motion sickness that gradually becomes severer due to headache.

On the basis of the type of a change in a symptom of a visually induced motion sickness, a symptom of a visually induced motion sickness may be estimated or predicted from, for example, a period of time for which video content is viewed (the time elapsed).

Moreover, specific details of processing of estimating a symptom of a visually induced motion sickness and processing of predicting the symptom of the visually induced motion sickness are not limited.

[Operation of Content Provision System]

FIG. 7 is a flowchart illustrating an example of an operation of the content provision system 100. Processing illustrated in FIG. 7 is, for example, loop processing performed repeatedly during playback of video content. The processing of playing back video content is performed by the content processor, and the loop processing illustrated in FIG. 7 is performed on the background.

First, the user information acquiring section 43 acquires user characteristic information regarding the user 1 who is using the content provision system 100 (Step 101). Specifically, user characteristic information (such as the history information illustrated in FIG. 6) stored in the user database 33 is read as appropriate.

Next, the content information acquiring section 42 acquires content characteristic information regarding video content that is played back by the content provision system 100 (Step 102). Specifically, content characteristic information (such as the characteristics regarding ease of causing a motion sickness due to video content that are illustrated in FIG. 5) that is stored in the content database 32 is read as appropriate.

Note that the processes of Steps 101 and 102 may be performed as appropriate according to the progress of video content (such as switching between scenes).

Next, the user information acquiring section 43 acquires user state information that indicates a current state of the user 1 (Step 103). For example, data related to output, from, for example, the biological sensor 22, that is obtained by performing measurement on the user 1 who is viewing video content, and data related to details of speech freely provided by the user 1 are read.

Next, the content information acquiring section 42 acquires content state information that indicates a current state of video content (Step 104). For example, an ID of a scene that is included in video content and is being played, and information that indicates a state of a motion sickness factor such as a change in screen and the number of characters are read from the content processor 41.

Next, the section 44 for estimating and predicting a motion sickness state performs at least one of estimation processing or prediction processing with respect to a state of a visually induced motion sickness of the user 1 (Step 105). Specifically, the estimation processing or prediction processing described with reference to, for example, FIGS. 3 to 6 is performed on the basis of at least one of the user characteristic information, the user state information, the content characteristic information, or the content state information, the user characteristic information, user state information, content characteristic information, and content state information being acquired in Steps 101 to 104.

For example, a degree and a symptom of a visually induced motion sickness of the user 1 are estimated by the estimation processing. Further, for example, the degree and the symptom of the visually induced motion sickness after the elapse of a specified period of time are predicted by the prediction processing. Moreover, the type of a change in a degree of visually induced motion sickness, or the type of a change in a symptom of the visually induced motion sickness may be determined. These kinds of information are output to the stimulus controller 45 as visually-induced-motion-sickness information that indicates a state of a visually induced motion sickness of the user 1.

Next, the stimulus controller 45 selects and generates a suppression stimulus that suppresses a visually induced motion sickness, on the basis of visually-induced-motion-sickness information regarding the user 1 (Step 106).

In processing of selecting a suppression stimulus, a suppression stimulus provided to the user 1 is selected from the stimulus database 34 on the basis of an estimated value or a predicted value of a state of a visually induced motion sickness. This makes it possible to easily set, for example, the type (a pattern) of a suppression stimulus, a parameter for the suppression stimulus, and a portion to which the suppression stimulus is to be provided.

In processing of generating a suppression stimulus, the type of a suppression stimulus provided to the user 1, a parameter for the suppression stimulus, a portion to which the suppression stimulus is to be provided, and the like are calculated on the basis of an estimated value or a predicted value of a state of a visually induced motion sickness. For example, suppression-stimulus data that is stored in the stimulus database 34 may be adjusted, or new suppression-stimulus data may be generated.

Further, in Step 106, a timing of providing a suppression stimulus, a continuation period of time for which the suppression stimulus is provided continuously, and the like are calculated on the basis of the estimated value or the predicted value of the state of the visually induced motion sickness. For example, when a vibration stimulus is used, a timing of starting vibration, a continuation period of time for which the vibration is provided continuously, and the like are calculated. Alternatively, the number of repetition of a vibration stimulus, an interval of time between the vibration stimuli, or the like may be set.

In the present embodiment, provision of a suppression stimulus to the user 1 is controlled according to degree information that indicates a degree of visually induced motion sickness.

For example, whether to provide a suppression stimulus is determined according to a degree of visually induced motion sickness. Further, an intensity of a suppression stimulus, the type of the suppression stimulus, and the like are set according to a degree of visually induced motion sickness. Alternatively, a portion to which a suppression stimulus is to be provided, how often the suppression stimulus is provided, and the like may be set according to a degree of visually induced motion sickness.

Further, provision of a suppression stimulus to the user 1 may be controlled according to symptom information that indicates a symptom of a visually induced motion sickness.

Further, an intensity of a suppression stimulus, the type of the suppression stimulus, and the like are set according to a symptom of a visually induced motion sickness. Alternatively, a portion to which a suppression stimulus is to be provided, how often the suppression stimulus is provided, and the like may be set according to a symptom of a visually induced motion sickness.

The control on provision of a suppression stimulus will be specifically described with reference to, for example, FIGS. 8 to 13.

Next, the stimulus provision section 25 provided to the content provision system 100 provides a suppression stimulus (Step 107). Specifically, the stimulus controller 45 generates a signal used to provide a suppression stimulus, using data of a suppression stimulus selected and generated in Step 106, and the generated signal is output to the respective elements included in the stimulus provision section 25. At this point, a timing of outputting a signal to the respective elements, and a period of time for the outputting, and the like are adjusted to control a timing of providing a suppression stimulus, and a continuation period of time for which the suppression stimulus is provided continuously.

When a suppression stimulus is provided, it is determined whether video content has been terminated (Step 108). When the video content has not been terminated (No in Step 108), the processes of and after Step 103 are performed again. Further, when the video content has been terminated (Yes in Step 108), the processing illustrated in FIG. 7 is terminated.

[Control Performed on Provision of Suppression Stimulus According to State of Visually Induced Motion Sickness]

A method for controlling provision of a suppression stimulus using visually-induced-motion-sickness information regarding the user 1 is described.

A vibration stimulus that is provided by the vibration element 26 is described below as an example of a suppression stimulus.

In this case, the type (a pattern) of vibration stimulus is set according to a state of a visually induced motion sickness. For example, a pattern of, for example, vibration stimuli provided with a constant period, irregularly provided vibration stimuli, vibration stimuli gradually made stronger, or vibration stimuli gradually made weaker is set.

Further, vibration-related parameters (a strength of vibration, the number of times of vibration, a portion to which vibration is to be provided), a timing of providing a vibration stimulus, a continuation period of time for which the vibration stimulus is provided continuously, and the like are set according to a state of a visually induced motion sickness.

Note that details described below can also be applied to the case in which a stimulus (such as an electric stimulus) other than a vibration stimulus is used as a suppression stimulus.

[Control Performed on Provision of Suppression Stimulus According to Estimated Value]

Figure 8:
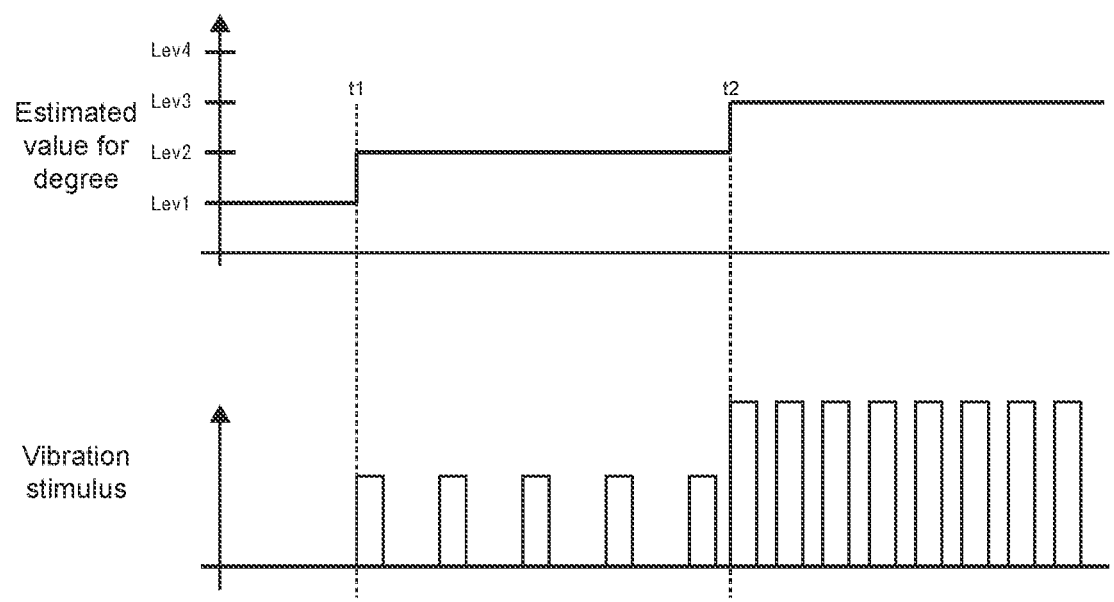
FIG. 8 is a time chart illustrating an example of provision of a stimulus using estimation information regarding estimation of a motion sickness state.

FIG. 8 is a time chart illustrating an example of provision of a stimulus using estimation information regarding estimation of a motion sickness state. A graph illustrated in an upper portion of FIG. 8 is a graph about an estimated value for a degree of a visually induced motion sickness of the user 1 at a timing t, where a vertical axis represents a level of the estimated value (Level 1 to Level 4). Further, a graph illustrated in a lower portion of FIG. 8 is a graph about a control signal for a vibration stimulus at the timing t, where a vertical axis represents an intensity of a vibration stimulus.

In the present embodiment, the stimulus controller 45 starts providing a vibration stimulus (a suppression stimulus) to the user 1 when a degree of visually induced motion sickness that is indicated by degree information reaches a specified level. In other words, a vibration stimulus is provided to the user 1 when the degree of visually induced motion sickness increases and exceeds a specified level that corresponds to a threshold. Further, a vibration stimulus is not provided when the degree of visually induced motion sickness is less than or equal to the specified level. This makes it possible to avoid providing, for example, an excessive stimulus.

The specified level is set to be a level at which a sign of a visually induced motion sickness of the user 1 is shown.

In the present embodiment, the specified level is set to be Level 2. In other words, a vibration stimulus (a suppression stimulus) starts being provided when the user 1 is not aware of a symptom of a visually induced motion sickness but there is a change in physical condition.

A stimulus starts being provided in an initial stage of a visually induced motion sickness in which the user 1 is not aware of a symptom of the visually induced motion sickness, as described above. This may make it possible to delay in increase in a degree of visually induced motion sickness or to relieve a symptom. Further, this may also make it possible to avoid causing a symptom.

In the example illustrated in FIG. 8, a degree of a visually induced motion sickness of the user 1 is estimated to be Level 2 at a timing t1. In this case, the stimulus controller 45 starts performing processing of providing a vibration stimulus. Note that it is conceivable that the user 1 would not be aware of a symptom of the visually induced motion sickness at the timing t1. Thus, in FIG. 8, a vibration stimulus provided after t1 is set such that the vibration stimulus exhibits a relatively low intensity and is provided relatively less often. Consequently, vibration is provided to be less noticeable. This makes it possible to suppress a visually induced motion sickness without interrupting a viewing experience of the user 1.

Further, in the example illustrated in FIG. 8, the degree of the visually induced motion sickness of the user 1 is estimated to be Level 3 at a timing t2. In this case, it is conceivable that the user 1 would start feeling the symptom of the visually induced motion sickness. Thus, in FIG. 8, a vibration stimulus provided after t2 is set such that the vibration stimulus exhibits a higher intensity and is provided more often, compared with the previously provided vibration stimulus. This makes it possible to effectively suppress an increase in a degree of visually induced motion sickness. A parameter for a vibration stimulus may be changed according to a degree of visually induced motion sickness, as described above.

When a stimulus is provided using estimation information regarding estimation of a motion sickness state, the provision of a vibration stimulus is controlled in response to a current degree of a visually induced motion sickness of the user 1, as described above. This makes it possible to provide a suppression stimulus with certainty according to a change in a state of a visually induced motion sickness, and thus to sufficiently suppress a visually induced motion sickness.

[Control Performed on Provision of Suppression Stimulus According to Predicted Value]

Figure 9:
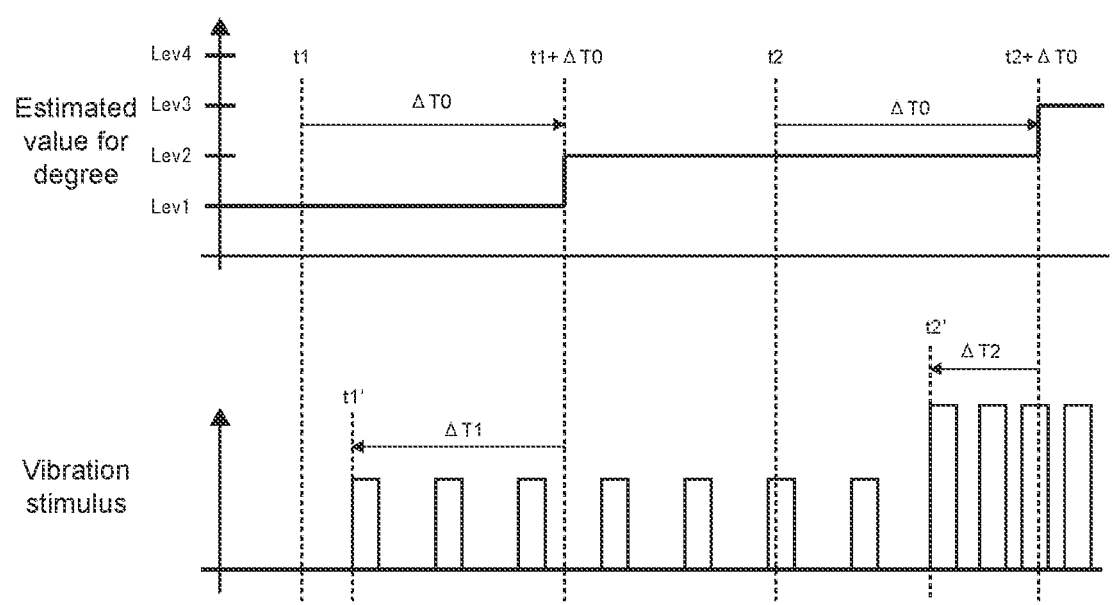
FIG. 9 is a time chart illustrating an example of provision of a stimulus using prediction information regarding prediction of a motion sickness state.

FIG. 9 is a time chart illustrating an example of provision of a stimulus using prediction information regarding prediction of a motion sickness state. Here, it is assumed that a predicted value for a degree of a visually induced motion sickness of the user 1 after the elapse of a specified period of time ($\Delta T0$) is calculated, which is an example of the prediction processing.

A graph illustrated in an upper portion of FIG. 9 is a graph about a predicted value for a degree of a visually induced motion sickness, the predicted value being predicted at a timing t, where a vertical axis represents a level of the predicted value (Level 1 to Level 4). Further, a graph illustrated in a lower portion of FIG. 9 is a graph about a control signal for a vibration stimulus at the timing t, where a vertical axis represents an intensity of a vibration stimulus.

In the example illustrated in FIG. 9, a degree of a visually induced motion sickness of the user 1 is predicted at a timing t1 to increase up to Level 2 after the elapse of $\Delta T0$. In this case, the stimulus controller 45 sets a timing t1' of providing a vibration stimulus at a point in time prior to a timing (t1+$\Delta T0$) at which the degree of visually induced motion sickness reaches Level 2. Here, setting is performed such that t1'=(t1+$\Delta T0$)−$\Delta T1$. Here, $\Delta T1$ is a constant less than or equal to $\Delta T0$. $\Delta T1$ may be set according to, for example, the type of a change in a degree of a visually induced motion sickness of the user 1, or a default may be used as $\Delta T1$.

This makes it possible to provide a vibration stimulus before a symptom of a visually induced motion sickness is shown. According to such processing, an effect of sufficiently delaying in increase in a degree of visually induced motion sickness is expected to be provided.

Further, in the example illustrated in FIG. 9, the degree of a visually induced motion sickness of the user 1 is predicted at a timing t2 to increase up to Level 3 at a timing (t2+$\Delta T0$). In this case, before the timing at which the degree of visually induced motion sickness reaches Level 3, control is performed such that a vibration stimulus exhibits a higher intensity and is provided more often. Using a constant ΔT2, a timing t2' at which such control is performed is set such that t2'=(t1+ΔT0)−ΔT2.

Consequently, an effect of sufficiently delaying in the user 1 becoming aware of a symptom of a visually induced motion sickness is expected to be provided.

Examples of Control Performed on Provision of Suppression Stimulus

FIGS. 10 to 13 are time charts each illustrating an example of provision of a stimulus. Examples of control performed when a suppression stimulus is provided according to a state of a visually induced motion sickness, are respectively described below with reference to FIGS. 10 to 13. Note that, here, an example of using estimation information regarding estimation of a visually induced motion sickness is primarily described. However, the following description can also be applied as appropriate to the case in which prediction information is used.

In FIG. 10, a vibration stimulus is provided according to a symptom of a visually induced motion sickness. A result of estimating a symptom (headache, dizziness, and nausea) of a visually induced motion sickness of the user 1 is illustrated in an upper portion of FIG. 10. Further, a graph about a control signal for a vibration stimulus is illustrated in a lower portion of FIG. 10.

For example, it is conceivable that a stimulus that provides an effect of reducing a degree of motion sickness would differ depending on the type of a symptom of a visually induced motion sickness. Thus, in the present embodiment, the stimulus controller 45 sets the type of a suppression stimulus provided to the user 1, according to a symptom of a visually induced motion sickness. This makes it possible to provide a suppression stimulus suitable for a symptom of a visually induced motion sickness, and thus to improve an effect of suppressing a visually induced motion sickness.

Here, for example, the type of vibration stimulus (a vibration pattern) or a portion to which a vibration stimulus is to be provided is set as the type of suppression stimulus according to a symptom of a visually induced motion sickness. Further, another stimulus such as a pressure-sense stimulus, a hot-and-cold stimulus, an electric stimulus, a sound stimulus, or a light stimulus may be set instead of a vibration stimulus.

In the example illustrated in FIG. 10, it is estimated at a timing t1 that the user 1 feels dizzy, and provision of a vibration stimulus of Type 1 is started. Thereafter, it is estimated at a timing t2 that the user has a headache, and the type of vibration stimulus is changed from Type 1 to Type 2. Further, it is estimated at a timing t3 that the user feels nauseous, and the type of vibration stimulus is changed from Type 2 to Type 3.

A correspondence relationship between a symptom of a visually induced motion sickness and the type of stimulus can be specified on the basis of, for example, characteristics of a user or history information regarding the user. For example, a certain stimulus is specified to be recorded as user characteristic information, where a great effect of preventing a symptom from being made worse or a great effect of reducing a degree of visually induced motion sickness was provided when the certain stimulus was provided to the user 1 in the past.

In the present embodiment, information regarding a stimulus that provides a great effect of suppressing a visually induced motion sickness of the user 1 is acquired, and the stimulus providing the great suppression effect is provided to the user 1, as described above. This makes it possible to effectively suppress a state of a visually induced motion sickness.

In FIG. 11, a vibration stimulus is provided according to the type of a change in a degree of visually induced motion sickness. A result of estimating a degree of a visually induced motion sickness of the user 1 is illustrated in an upper portion of each of A and B of FIG. 11, and a graph about a control signal for a vibration stimulus is illustrated in a lower portion of each of A and B of FIG. 11. A and B of FIG. 11 illustrate examples of controlling a vibration stimulus for the users 1 with different types of a change in a degree of visually induced motion sickness.

In the present embodiment, a timing of providing a suppression stimulus is set according to the type of a change in a degree of visually induced motion sickness. The type of a change in a degree of visually induced motion sickness can be determined on the basis of, for example, history information regarding the user 1 (refer to FIG. 6). The stimulus controller determines the type of a change in a current degree of visually induced motion sickness of the user 1, and adjusts a timing of providing a suppression stimulus, on the basis of a result of the determination.

This makes it possible to provide a suppression stimulus at a timing dependent on an increase in a degree of a visually induced motion sickness of the user 1. This results in being able to avoid, for example, delaying in providing a suppression stimulus or unnecessarily providing a suppression stimulus in too early a stage.

A of FIG. 11 illustrates an example of controlling a vibration stimulus provided to the user 1 who is the type of person showing a rapid increase in a degree of visually induced motion sickness. In the case of this user 1, for example, a degree of visually induced motion sickness increases up to Level 2 at a timing t1, and then the degree of visually induced motion sickness increases up to Level 3 in a relatively short time.

With respect to the user 1 showing a rapid change in a degree of visually induced motion sickness as described above, it is favorable that a vibration stimulus be provided at once. Thus, in A of FIG. 11, provision of a vibration stimulus is started at a point in time (a timing t1) at which a sign of a visually induced motion sickness is estimated to be shown.

On the other hand, B of FIG. 11 illustrates an example of controlling a vibration stimulus provided to the user 1 who is the type of person showing a gradual increase in a degree of visually induced motion sickness. In the case of this user 1, a degree of visually induced motion sickness increases up to Level 2 at the timing t1, and then the degree of visually induced motion sickness remains unchanged at Level 2 for a relatively long time. Thereafter, the degree of visually induced motion sickness increases up to Level 3.

If a vibration stimulus is provided in an early stage to the user 1 who shows a sign of a visually induced motion sickness for a long time as described above, this may result in unnecessarily interrupting a viewing experience of the user 1. Thus, in B of FIG. 11, provision of a vibration stimulus is started at a timing t1' that is reached after the elapse of a certain delay time (delay) since the point in time (the timing t1) at which a sign of a visually induced motion sickness is estimated to be shown in A of FIG. 11.

A method for setting a delay time is not limited, and may be set as appropriate according to, for example, a history of the user 1 in the past.

In FIG. 12, a vibration stimulus is changed considering that the user 1 gets used to a vibration stimulus. Switching between scenes of video content is schematically illustrated in each of upper portions of A and B of FIG. 12, and a graph about a control signal for a vibration stimulus is illustrated in each of lower portions of A and B of FIG. 12. Here, it is assumed that, for example, a degree of visually induced motion sickness has reached a certain level and control on provision of a vibration stimulus is performed at a certain interval of time.

In A of FIG. 12, the type of vibration stimulus is changed according to a scene of video content (scenes A, B, C . . . ). For example, a vibration stimulus of Type 1 is provided when the scene A is played, a vibration stimulus of Type 2 is provided when the scene B is played, and a vibration stimulus of Type 3 is provided when the scene C is played.

Note that, when a vibration stimulus is used, parameters such as a frequency, an intensity, and a portion to which the vibration stimulus is to be provided may be changed for each scene, in addition to the type of vibration stimulus (a vibration pattern).

Of course, not only the type of vibration stimulus and the like but also the type of suppression stimulus itself may be changed.

In the present embodiment, the stimulus controller 45 changes, for each scene included in video content, a suppression stimulus provided to the user 1, as described above. A correspondence relationship between each scene and a suppression stimulus may be set discretionarily.

For example, a typical degree of ease of causing a motion sickness (content characteristic information) is estimated upon creation of video content. Then, video content that is assigned a suppression stimulus for a visually induced motion sickness according to an estimated value for each scene may be created.

Further, a corresponding type of suppression stimulus or a corresponding stimulus pattern may be set according to characteristics of video content or constraints upon creation of the video content. For example, in a scene in which a stimulus (a content stimulus) is provided as arrangement in content, a position of a portion to which a suppression stimulus is to be provided can be shifted from a position of a portion to which a content stimulus is to be provided, in order for the suppression stimulus to not be mixed up with the content stimulus. Further, in a relatively quiet scene, a stimulus that exhibits a decreased intensity to be less noticeable can also be set to be provided.

Note that a suppression stimulus and a scene do not necessarily have to be associated with each other, and switching between suppression stimuli may be performed in a specified order in response to switching between scenes being performed.

The change in suppression stimulus for each scene makes it possible to prevent the user 1 from getting used to a suppression stimulus, and thus to naturally keep an effect of suppressing a visually induced motion sickness.

In B of FIG. 12, the type of vibration stimulus is changed at a specified interval of time ΔT. In this example, a vibration stimulus of Type 1, a vibration stimulus of Type 2, and a vibration stimulus of Type 3 are used in this order by performing switching between the vibration stimuli. Further, a vibration stimulus of the same type is provided at a specified interval of time until a switching timing. Here, the vibration stimulus of the same type is provided four times during ΔT.

Without being limited thereto, setting can be performed such that the interval of time used to provide a vibration stimulus is set to ΔT to change the type of stimulus each time. Further, a stimulus may be used by being selected at random, instead of repeatedly providing stimuli in a certain order.

As described above, the stimulus controller 45 may change, for each specified interval of time ΔT, a suppression stimulus provided to the user 1.

This makes it possible to easily perform processing of, for example, equally providing a plurality of suppression stimuli to the user 1. This results in being able to prevent the user 1 from getting used to a suppression stimulus, and thus to easily keep an effect of suppressing a visually induced motion sickness.

In FIG. 13, a vibration stimulus that is to be provided to the user 1 is selected according to an effect provided to the user 1 by a vibration stimulus. A result of estimating a degree of a visually induced motion sickness of the user 1 is illustrated in an upper portion of each of A and B of FIG. 13, and a graph about a control signal for a vibration stimulus is illustrated in a lower portion of each of A and B of FIG. 13. Here, it is assumed that provision of a vibration stimulus is started at a timing t1.

A and B of FIG. 13 illustrate examples of controlling a vibration stimulus for the users 1 with different types of an effect of suppressing a degree of visually induced motion sickness, the effect being provided by the same stimulus.

In the present embodiment, it is determined whether an effect of suppressing a visually induced motion sickness lasts on the user 1, the effect being provided by the same stimulus. Then, when it has been determined that the suppression effect lasts, the same suppression stimulus is continuously provided to the user 1. Further, when it has been determined that the suppression effect does not last, the type of a suppression stimulus provided to the user 1 is changed.

Determination of whether the user 1 is the type of person on whom a suppression effect provided by the same suppression stimulus lasts can be performed on the basis of, for example, history information regarding the user 1. For example, it is determined to what extent an increase in a degree of visually induced motion sickness is suppressed by the same stimulus in a history of the user 1 in the past.

A of FIG. 13 illustrates an example of controlling a vibration stimulus provided to the user 1 who is the type of person on whom an effect of suppressing a visually induced motion sickness lasts, the effect being provided by the same suppression stimulus. The suppression effect on this user 1 will last even if the same vibration stimulus is continuously provided. Thus, the stimulus controller 45 continuously provides a vibration stimulus of the same type to the user 1.

On the other hand, B of FIG. 13 illustrates an example of controlling a vibration stimulus provided to the user 1 who is the type of person on whom an effect of suppressing a visually induced motion sickness does not last, the effect being provided by the same suppression stimulus. The suppression effect on this user 1 may be reduced if the same vibration stimulus is continuously provided to the user 1. Thus, the stimulus controller 45 changes the type of vibration stimulus to prevent the user 1 from getting used to a stimulus. This makes it possible to improve the suppression effect, compared to when the same stimulus is continuously provided. This results in being able to sufficiently delay in increase in a degree of visually induced motion sickness.

Further, depending on the user 1, there may be a change in an effect of a suppression stimulus before and after an onset of a visually induced motion sickness. Here, the onset of a visually induced motion sickness refers to, for example, a state in which the user 1 is aware of a symptom of a visually induced motion sickness. For example, at the onset of a visually induced motion sickness, the degree of visually induced motion sickness enters a motion sickness starting phase corresponding to Level 3 from a sign phase corresponding to Level 2.

Depending on the user 1, an effect provided by a suppression stimulus may be difficult to last after the onset of such a visually induced motion sickness. On the other hand, there may be the type of person on whom a suppression effect provided by a suppression stimulus also lasts after the onset of a visually induced motion sickness. As described above, provision of a suppression stimulus may be controlled according to a suppression effect after the onset of a visually induced motion sickness.

For example, a suppression stimulus will be continuously provided to the user 1 after an onset of a visually induced motion sickness if the user 1 is the type of person on whom an effect of the suppression stimulus is not reduced after the onset. This makes it possible to avoid decreasing a degree of a visually induced motion sickness even after the user 1 starts getting a motion sickness.

Further, for example, there is a change in the type of suppression stimulus for the user 1 on whom an effect of suppressing a visually induced motion sickness is reduced at the onset of the visually induced motion sickness. This makes it possible to improve the suppression effect, compared to when the same stimulus is continuously provided. Further, provision of a suppression stimulus to the user 1 on whom the suppression effect is reduced may be stopped.

Furthermore, with respect to the user 1 on whom an effect provided by a suppression stimulus may be difficult to last, control may also be performed such that provision of a stimulus that causes, for example, a sense of realism of video content to be lost is avoided. This makes it possible to avoid providing a less effective stimulus and unnecessarily interrupting a viewing experience of the user 1.

As described above, the information processing apparatus 40 according to the present embodiment provides a suppression stimulus to the user 1 who is viewing video content. Here, the provision of a request stimulus to the user 1 is controlled on the basis of information obtained by estimating or predicting a state of a visually induced motion sickness of the user 1. This makes it possible to, for example, provide a suppression stimulus suitable for a state of the user 1, and thus to sufficiently suppress a visually induced motion sickness of the user 1.

Other Embodiments

The present technology is not limited to the embodiments described above, and can achieve various other embodiments.

In the embodiments described above, information regarding characteristics regarding ease of causing a motion sickness (refer to, for example, FIG. 5) is used as content characteristic information, the characteristics regarding ease of causing a motion sickness being estimated from a state of, for example a motion sickness factor of video content.

Without being limited thereto, data or the like of a visually induced motion sickness that is obtained when another user views video content may be used as the content characteristic information.

For example, actual motion sickness states of a significant number of test users may be acquired before video content is released. In other words, characteristics regarding a visually induced motion sickness of a test user (history information regarding a test user) may be used as characteristics of video content. In this case, characteristics regarding ease of causing a motion sickness for the entirety of content or for each scene are estimated from a state (a degree or a symptom) of a visually induced motion sickness of a test user, and the estimated characteristics are added to video content that is to be released.

Further, for example, a motion sickness state may be acquired from data of an early-stage user immediately after release of video content, and the acquired motion sickness state may be added to the video content such that a user subsequent to the early-stage user can use the added motion sickness state. In other words, information regarding a visually induced motion sickness of an early-stage user may be used as characteristics regarding ease of causing a motion sickness due to video content. In this case, data added to video content is updated for each certain period of time.

Further, analysis of whether characteristics regarding a visually induced motion sickness differ depending on, for example, gender, age, region, or race may be performed to use the analysis for estimation of a motion sickness state.

Further, the present technology also serves as a recording tool that builds a database of, for example, history information obtained by recording individual characteristics related to a visually induced motion sickness of a user. The use of individual visually-induced-motion-sickness-related characteristics accumulated as described above also makes it possible to estimate a state of a visually induced motion sickness caused when, for example, a target views other video content.

This makes it possible to recommend content that does not cause a motion sickness (content that does not easily cause a motion sickness) when, for example, a target purchases video content.

Further, upon selection of video content, a rating or the like of an estimated visually induced motion sickness can be added to the video content to provide the video content.

Furthermore, upon setting or the like of video content, a course or the like with which a target does not easily get a motion sickness can be set individually, or a recommendation set value can be provided.

The method for providing a suppression stimulus according to a state of a visually induced motion sickness of a user who is viewing video content has been described above. Without being limited thereto, processing of dynamically generating video content itself may be performed according to a state of a visually induced motion sickness of a user.

Figure 14:
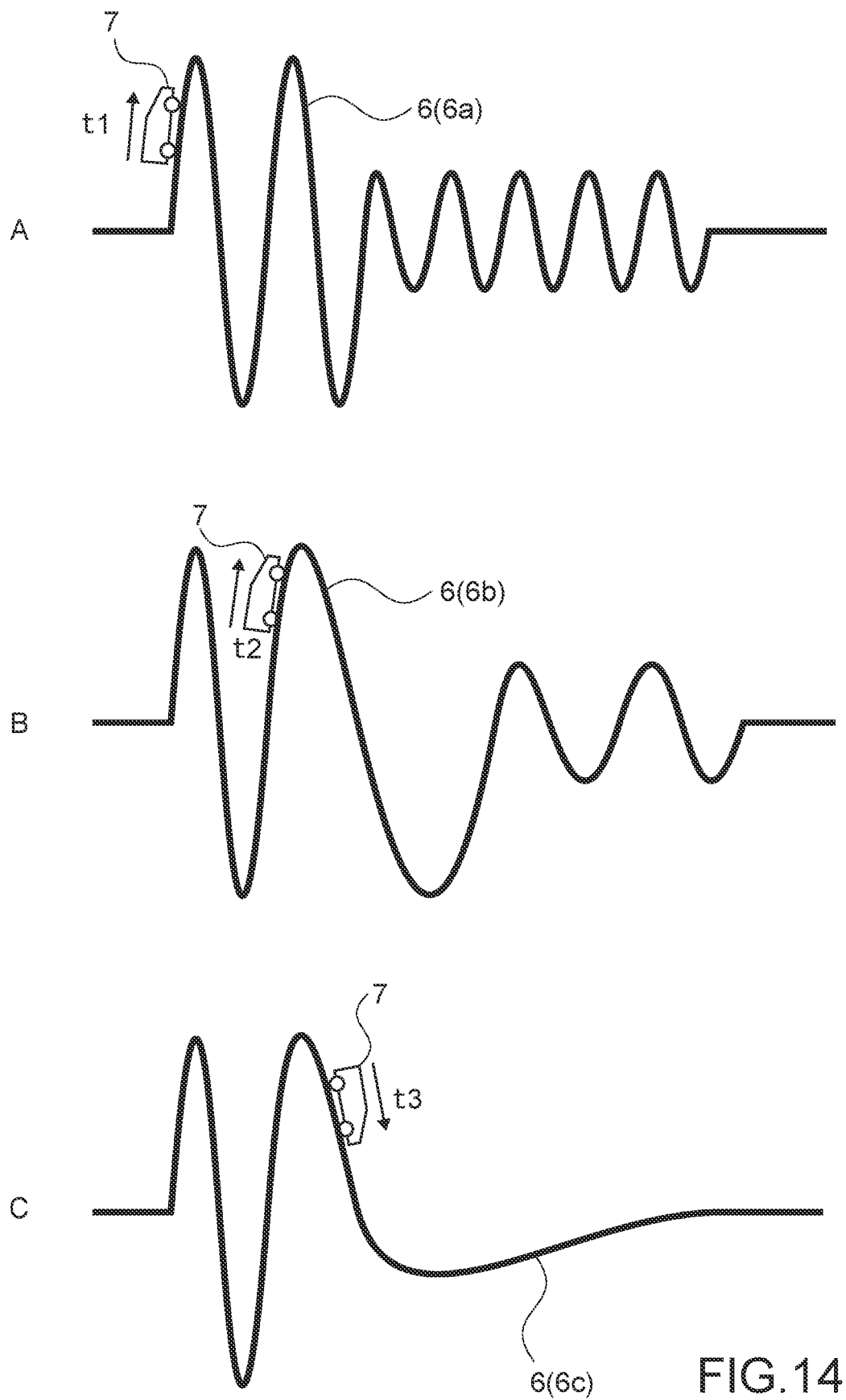
FIG. 14 schematically illustrates modifications of video content according to a state of a motion sickness.

FIG. 14 schematically illustrates modifications of video content according to a state of a visually induced motion sickness. A to C of FIG. 14 each schematically illustrate a course 6 of a driving game and a vehicle 7 that is traveling along the course 6, which is an example of video content.

In this video content, a video as viewed from the vehicle 7 traveling along the course 6 is displayed to a user. Thus, a degree of a change in background and how often the background is changed are determined by how the course 6 is curved and how often the course 6 is curved.

A of FIG. 14 schematically illustrates a course 6a at a timing t1. At this point, the course includes a group of curves set at a relatively long interval, and a group of subsequent curves set at a relatively short interval.

It is assumed that a degree of a visually induced motion sickness of a user increases by one stage at the timing t1. In this case, the course 6a illustrated in A of FIG. 14 is changed to a course 6b illustrated in B of FIG. 14. In other words, a curve included in a group of curves, from among the group of curves set at a relatively long interval, that is not reached by the vehicle 7, is set to be gentler. Further, the number of curves included in the group of curves set at a relatively short interval is reduced, and each of the curves is set to be gentler. This makes it possible to make a degree of a change in background lower and to cause the background to be changed less often. Thus, the course 6b corresponds to the course 6 for which a degree of ease of causing a motion sickness of characteristics regarding ease of causing a motion sickness is set lower, compared with the course 6a before change.

Further, it is assumed that the degree of a visually induced motion sickness of a user further increases by one stage at a timing t2, as illustrated in B of FIG. 14. In this case, the course 6b illustrated in B of FIG. 14 is changed to a course 6c illustrated in C of FIG. 14. In other words, further, the group of curves set at a relatively short interval is removed. Consequently, the background is no longer changed greatly in the latter half of the course 6, and this makes it possible to set the degree of ease of causing a motion sickness of characteristics regarding ease of causing a motion sickness sufficiently low.

As described above, video content may be changed on the basis of information regarding a visually induced motion sickness of a user, such that an increase in a degree of visually induced motion sickness is sufficiently suppressed. This enables a user to continuously enjoy a viewing experience without making a symptom of a visually induced motion sickness worse.

Note that the present technology is not limited to a change in the course 6, and, for example, a speed of the vehicle 7, an item forming video content, a background image forming the video content, or sound forming the video content may be dynamically changed such that a degree of a visually induced motion sickness of a user does not increase.

A system that uses the HMD 10 used to provide VR experience has been described above. Without being limited thereto, the present technology may be applied to, for example, an HMD for AR experience. In this case, an outward-oriented camera used to perform image-capturing on a field of view of a user is provided to the HMD, and a video captured by the outward-oriented camera is displayed on a display unit. A virtual object is superimposed on the video to be displayed, and this makes it possible to provide AR experience. When the HMD having such a configuration is used, a visually induced motion sickness of a user can also be sufficiently suppressed by controlling provision of a suppression stimulus according to information obtained by estimating or predicting a state of a visually induced motion sickness of a user.

Moreover, the present technology can also be applied to a system that uses a stationary display such as a large display or a surrounding display. Also in this case, provision of a suppression stimulus to a user is controlled according to a result of estimating or predicting a state of a visually induced motion sickness of the user.

Further, the type and the like of video content are not limited.

For example, video content is game content that provides various amusements in a VR space. Further, video content that serves as a simulator that is provided on the assumption of steering of vehicles such as car, airplane, and ship, or on the assumption of field operations, may be used. Further, a video of a site of work that is used for remote control, a virtual video used for operation support, or the like may be used as video content.

Moreover, the present technology can be applied to any video content.

An example in which the information processing method according to the present technology is executed by the information processing apparatus 40 operated by a user has been described above. However, the information processing method and the program according to the present technology may be executed by the information processing apparatus 40 and another computer that is capable of communicating with the information processing apparatus 40 through, for example, a network.

In other words, the information processing method and the program according to the present technology can be executed not only in a computer system that includes a single computer, but also in a computer system in which a plurality of computers operates cooperatively. Note that, in the present disclosure, the system refers to a set of components (such as apparatuses and modules (parts)) and it does not matter whether all of the components are in a single housing. Thus, a plurality of apparatuses accommodated in separate housings and connected to each other through a network, and a single apparatus in which a plurality of modules is accommodated in a single housing are both the system.

The execution of the information processing method and the program according to the present technology by the computer system includes, for example, both the case in which the processing of acquiring visually-induced-motion-sickness information and the processing of controlling provision of a stimulus are executed by a single computer; and the case in which the respective processes are executed by different computers. Further, the execution of the respective processes by a specified computer includes causing another computer to execute a portion of or all of the processes and acquiring a result of it.

In other words, the information processing method and the program according to the present technology are also applicable to a configuration of cloud computing in which a single function is shared and cooperatively processed by a plurality of apparatuses through a network.

At least two of the features of the present technology described above can also be combined. In other words, the various features described in the respective embodiments may be combined discretionarily regardless of the embodiments. Further, the various effects described above are not limitative but are merely illustrative, and other effects may be provided.

In the present disclosure, expressions such as "same", "equal", and "orthogonal" include, in concept, expressions such as "substantially the same", "substantially equal", and "substantially orthogonal". For example, the expressions such as "same", "equal", and "orthogonal" also include states within specified ranges (such as a range of +/−10%), with expressions such as "exactly the same", "exactly equal", and "completely orthogonal" being used as references.

Note that the present technology may also take the following configurations.
(1) An information processing apparatus, including:
　an acquisition section that acquires visually-induced-motion-sickness information that includes at least one of information obtained by estimating a state of a visually induced motion sickness of a user who is viewing video content, or information obtained by predicting the state of the visually induced motion sickness; and
　a stimulus controller that controls provision of a stimulus to the user, on the basis of the visually-induced-motion-sickness information.

(2) The information processing apparatus according to (1), in which
the acquisition section acquires, as the visually-induced-motion-sickness information, degree information that includes at least one of information obtained by estimating a degree of the visually induced motion sickness of the user, or information obtained by predicting the degree of the visually induced motion sickness, and
the stimulus controller controls the provision of the stimulus to the user according to the degree information.

(3) The information processing apparatus according to (2), in which
the stimulus controller starts the provision of the stimulus to the user when the degree of the visually induced motion sickness reaches a specified level, the degree of the visually induced motion sickness being indicated by the degree information.

(4) The information processing apparatus according to (3), in which
the specified level is set to be a level at which a sign of the visually induced motion sickness of the user is shown.

(5) The information processing apparatus according to any one of (1) to (4), in which
on the basis of at least one of user state information that indicates a visually-induced-motion-sickness-related state of the user, user characteristic information that indicates visually-induced-motion-sickness-related characteristics of the user, content state information that indicates a visually-induced-motion-sickness-related state of the video content, or content characteristic information that indicates visually-induced-motion-sickness-related characteristics of the video content, the acquisition section performs at least one of estimation processing or prediction processing to generate the visually-induced-motion-sickness information, the estimation processing being processing of estimating the state of the visually induced motion sickness of the user, the prediction processing being processing of predicting the state of the visually induced motion sickness of the user.

(6) The information processing apparatus according to (5), in which
the user state information includes at least one of biological information regarding the user, operation information regarding an operation performed by the user, speech information regarding speech of the user, or report information regarding a report of the user.

(7) The information processing apparatus according to (6), in which
the biological information includes information regarding at least one of a sweat volume of the user, a heart rate of the user, an amount of a movement of eyeballs of the user, body shaking of the user, or an electrocardiogram waveform of the user.

(8) The information processing apparatus according to any one of (5) to (7), in which
the content state information includes information regarding a motion sickness factor for a visually induced motion sickness in the video content, which is being played back, and
on the basis of the information regarding the motion sickness factor that is included in the content state information, the acquisition section estimates characteristics regarding ease of causing a motion sickness due to the video content, which is being played back.

(9) The information processing apparatus according to any one of (5) to (8), in which
for each scene included in the video content, or for the entirety of content, the content characteristic information includes information regarding pre-estimated characteristics regarding ease of causing a motion sickness due to the video content, and
the acquisition section reads the characteristics regarding ease of causing a motion sickness that are included in the content characteristic information.

(10) The information processing apparatus according to any one of (5) to (9), in which
the user characteristic information includes history information obtained by recording a state of a visually induced motion sickness caused upon a previous viewing experience of the user, and characteristics regarding ease of causing a motion sickness upon the viewing experience, the state and characteristics being recorded in association with each other, and
the acquisition section generates the visually-induced-motion-sickness information on the basis of characteristics regarding ease of causing a motion sickness due to the video content, which is being played back, and on the basis of the history information.

(11) The information processing apparatus according to any one of (1) to (10), in which
on the basis of the visually-induced-motion-sickness information, the stimulus controller controls at least one of a timing of providing the stimulus, a continuation period of time for which the stimulus is provided continuously, a parameter for the stimulus, or a type of the stimulus.

(12) The information processing apparatus according to (11), in which
the acquisition section acquires, as the visually-induced-motion-sickness information, information regarding a symptom of the visually induced motion sickness of the user, and
the stimulus controller sets the type of the stimulus provided to the user, according to the symptom of the visually induced motion sickness.

(13) The information processing apparatus according to (11) or (12), in which
the acquisition section acquires, as the visually-induced-motion-sickness information, information regarding a type of a change in a degree of the visually induced motion sickness of the user, and
the stimulus controller sets the timing of providing the stimulus, according to the type of the change in the degree of the visually induced motion sickness.

(14) The information processing apparatus according to any one of (1) to (13), in which
the acquisition section acquires information regarding a stimulus that provides a great effect of suppressing the visually induced motion sickness of the user, and
the stimulus controller provides, to the user, the stimulus providing the great suppression effect.

(15) The information processing apparatus according to any one of (1) to (14), in which
for each scene included in the video content or for each specified interval of time, the stimulus controller changes the stimulus provided to the user.

(16) The information processing apparatus according to any one of (1) to (15), in which the acquisition section determines whether an effect of suppressing a visually induced motion sickness lasts on the user, the effect being provided by the same stimulus, when the acquisition section has determined that the suppression effect lasts, the stimulus controller continuously provides the same stimulus to the user, and when the acquisition section has determined that the suppression effect does not last, the stimulus controller changes a type of the stimulus provided to the user.

(17) The information processing apparatus according to any one of (1) to (16), in which
the stimulus provided to the user includes at least one of a vibration stimulus, an electric stimulus, a sound stimulus, or a light stimulus.

(18) The information processing apparatus according to any one of (1) to (17), in which
on the basis of the visually-induced-motion-sickness information, the stimulus controller changes the video content such that an increase in a degree of the visually induced motion sickness of the user is suppressed.

(19) An information processing method that is performed by a computer system, the information processing method including:
acquiring visually-induced-motion-sickness information that includes at least one of information obtained by estimating a state of a visually induced motion sickness of a user who is viewing video content, or information obtained by predicting the state of the visually induced motion sickness; and
controlling provision of a stimulus to the user, on the basis of the visually-induced-motion-sickness information.

(20) A program that causes a computer system to perform a process including:
acquiring visually-induced-motion-sickness information that includes at least one of information obtained by estimating a state of a visually induced motion sickness of a user who is viewing video content, or information obtained by predicting the state of the visually induced motion sickness; and
controlling provision of a stimulus to the user, on the basis of the visually-induced-motion-sickness information.

REFERENCE SIGNS LIST 1 user
10 HMD
13 display unit
20 controller
21 sensor section
25 stimulus provision section
30 storage
31 control program
32 content database
33 user database
34 stimulus database
40 information processing apparatus
41 content processor
42 content information acquiring section
43 user information acquiring section
44 section for estimating and predicting motion sickness state
45 stimulus controller
100 content provision system

The invention claimed is:

1. An information processing apparatus, comprising:
circuitry configured to acquire visually-induced-motion-sickness information that includes at least one of information obtained by estimating a state of a visually induced motion sickness of a user who is viewing video content, or information obtained by predicting the state of the visually induced motion sickness, and
control provision of a stimulus to the user, based on the visually-induced-motion-sickness information,
wherein for each scene included in the video content or for each specified interval of time, the circuitry changes the stimulus provided to the user.

2. The information processing apparatus according to claim 1, wherein
the circuitry acquires, as the visually-induced-motion-sickness information, degree information that includes at least one of information obtained by estimating a degree of the visually induced motion sickness of the user, or information obtained by predicting the degree of the visually induced motion sickness, and
the circuitry controls the provision of the stimulus to the user according to the degree information.

3. The information processing apparatus according to claim 2, wherein
the circuitry starts the provision of the stimulus to the user when the degree of the visually induced motion sickness reaches a specified level, the degree of the visually induced motion sickness being indicated by the degree information.

4. The information processing apparatus according to claim 3, wherein
the specified level is set to be a level at which a sign of the visually induced motion sickness of the user is shown.

5. The information processing apparatus according to claim 1, wherein
based on at least one of user state information that indicates a visually-induced-motion-sickness-related state of the user, user characteristic information that indicates visually-induced-motion-sickness-related characteristics of the user, content state information that indicates a visually-induced-motion-sickness-related state of the video content, or content characteristic information that indicates visually-induced-motion-sickness-related characteristics of the video content, the circuitry performs at least one of estimation processing or prediction processing to generate the visually-induced-motion-sickness information, the estimation processing being processing of estimating the state of the visually induced motion sickness of the user, the prediction processing being processing of predicting the state of the visually induced motion sickness of the user.

6. The information processing apparatus according to claim 5, wherein
the user state information includes at least one of biological information regarding the user, operation information regarding an operation performed by the user, speech information regarding speech of the user, or report information regarding a report of the user.

7. The information processing apparatus according to claim 6, wherein
the biological information includes information regarding at least one of a sweat volume of the user, a heart rate of the user, an amount of a movement of eyeballs of the user, body shaking of the user, or an electrocardiographic waveform of the user.

8. The information processing apparatus according to claim 5, wherein
the content state information includes information regarding a motion sickness factor for a visually induced motion sickness in the video content, which is being played back, and
based on the information regarding the motion sickness factor that is included in the content state information, the circuitry estimates characteristics regarding ease of causing a motion sickness due to the video content, which is being played back.

9. The information processing apparatus according to claim 5, wherein
for each scene included in the video content, or for the entirety of content, the content characteristic information includes information regarding pre-estimated characteristics regarding ease of causing a motion sickness due to the video content, and
the circuitry reads the characteristics regarding ease of causing a motion sickness that are included in the content characteristic information.

10. The information processing apparatus according to claim 5, wherein
the user characteristic information includes history information obtained by recording a state of a visually induced motion sickness caused upon a previous viewing experience of the user, and characteristics regarding ease of causing a motion sickness upon the viewing experience, the state and characteristics being recorded in association with each other, and
the circuitry generates the visually-induced-motion-sickness information based on characteristics regarding ease of causing a motion sickness due to the video content, which is being played back, and based on the history information.

11. The information processing apparatus according to claim 1, wherein
based on the visually-induced-motion-sickness information, the circuitry controls at least one of a timing of providing the stimulus, a continuation period of time for which the stimulus is provided continuously, a parameter for the stimulus, or a type of the stimulus.

12. The information processing apparatus according to claim 11, wherein
the circuitry acquires, as the visually-induced-motion-sickness information, information regarding a symptom of the visually induced motion sickness of the user, and
the circuitry sets the type of the stimulus provided to the user, according to the symptom of the visually induced motion sickness.

13. The information processing apparatus according to claim 11, wherein
the circuitry acquires, as the visually-induced-motion-sickness information, information regarding a type of a change in a degree of the visually induced motion sickness of the user, and
the circuitry sets the timing of providing the stimulus, according to the type of the change in the degree of the visually induced motion sickness.

14. The information processing apparatus according to claim 1, wherein
the circuitry acquires information regarding a stimulus that provides a great effect of suppressing the visually induced motion sickness of the user, and
the circuitry provides, to the user, the stimulus providing the great suppression effect.

15. The information processing apparatus according to claim 1, wherein
the circuitry determines whether an effect of suppressing a visually induced motion sickness lasts on the user, the effect being provided by the same stimulus,
when the circuitry has determined that the suppression effect lasts, the circuitry continuously provides the same stimulus to the user, and
when the acquisition section has determined that the suppression effect does not last, the circuitry changes a type of the stimulus provided to the user.

16. The information processing apparatus according to claim 1, wherein
the stimulus provided to the user includes at least one of a vibration stimulus, an electric stimulus, a sound stimulus, or a light stimulus.

17. The information processing apparatus according to claim 1, wherein
based on the visually-induced-motion-sickness information, the circuitry changes the video content such that an increase in a degree of the visually induced motion sickness of the user is suppressed.

18. An information processing method that is performed by a computer system, the information processing method comprising:
acquiring visually-induced-motion-sickness information that includes at least one of information obtained by estimating a state of a visually induced motion sickness of a user who is viewing video content, or information obtained by predicting the state of the visually induced motion sickness; and
controlling provision of a stimulus to the user, based on the visually-induced-motion-sickness information,
wherein the stimulus provided to the user is controlled to change for each scene included in the video content or for each specified interval of time.

19. A non-transitory computer-readable storage medium having embodied thereon a program, which when executed by a computer causes the computer to execute a method, the method comprising:
acquiring visually-induced-motion-sickness information that includes at least one of information obtained by estimating a state of a visually induced motion sickness of a user who is viewing video content, or information obtained by predicting the state of the visually induced motion sickness; and
controlling provision of a stimulus to the user, based on the visually-induced-motion-sickness information,
wherein the stimulus provided to the user is controlled to change for each scene included in the video content or for each specified interval of time.

* * * * *